(12) United States Patent
Nabar et al.

(10) Patent No.: US 8,155,597 B2
(45) Date of Patent: Apr. 10, 2012

(54) TRANSMISSION SCHEDULING FOR RECEIVER FEEDBACK

(75) Inventors: Rohit Nabar, Sunnyvale, CA (US); Hui-Ling Lou, Palo Alto, CA (US)

(73) Assignee: Marvell World Trade Ltd., St. Michael (BB)

( * ) Notice: Subject to any disclaimer, the term of this patent is extended or adjusted under 35 U.S.C. 154(b) by 1144 days.

(21) Appl. No.: 11/526,319

(22) Filed: Sep. 25, 2006

(65) Prior Publication Data

US 2008/0005219 A1 Jan. 3, 2008

Related U.S. Application Data

(60) Provisional application No. 60/757,605, filed on Jan. 10, 2006.

(51) Int. Cl.
*H04B 1/00* (2006.01)

(52) U.S. Cl. .... 455/69; 455/101; 455/67.11; 455/562.1; 455/277.1; 455/115.3

(58) Field of Classification Search ........... 455/69, 455/101, 67.11, 562.1, 277.1, 115.3
See application file for complete search history.

(56) References Cited

U.S. PATENT DOCUMENTS 7,020,069 B1 * 3/2006 Pollack et al. ............ 370/203
2003/0076777 A1 * 4/2003 Stuber et al. ............ 370/206
2004/0258150 A1 * 12/2004 Krichevsky ............ 375/240.01
2005/0152387 A1 * 7/2005 Utsunomiya et al. ........ 370/431
2006/0133530 A1 * 6/2006 Kwak et al. ............ 375/267
2006/0165008 A1 * 7/2006 Li et al. ............ 370/252
2007/0071067 A1 * 3/2007 Kwong et al. ............ 375/130

OTHER PUBLICATIONS 802.11n; IEEE P802.11-04/0889r6; Wireless LANs, TGn Sync Proposal Technical Specification; 134 pages.

* cited by examiner

*Primary Examiner* — Lana N Le
*Assistant Examiner* — Hsin-Chun Liao

(57) ABSTRACT

A network device including a first feedback module and a first calibration module. The first feedback module generates a first transmission schedule, which include (i) a first subcarrier schedule to determine an order of transmitting subcarriers and (ii) a first matrix map, and which is transmitted to a link partner. The first calibration module transmits a first set of training signals to the link partner, receives a first set of channel state information (CSI) (i) generated by the link partner based on the training signals and (ii) transmitted by the link partner according to the first transmission schedule, and generates a first CSI matrix based on the first set of CSI and the first matrix map. The first calibration module is configured to (i) generate the same first set of training signals for each of the subcarriers and (ii) receive the first set of CSI for each of the subcarriers.

46 Claims, 11 Drawing Sheets

TRANSMISSION SCHEDULING FOR RECEIVER FEEDBACK

CROSS-REFERENCE TO RELATED APPLICATIONS

This application claims the benefit of U.S. Provisional Application No. 60/757,605, filed on Jan. 10, 2006. The disclosure of the above application is incorporated herein by reference in its entirety.

FIELD

The present disclosure relates to wireless network devices, and more particularly to systems and methods for transmitting feedback from a receiving wireless network device.

BACKGROUND

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

IEEE defined several different standards for configuring wireless networks and devices. The wireless network devices may be operated in either an infrastructure mode or an ad-hoc mode. In the infrastructure mode, the wireless network devices or client stations communicate with each other through an access point. In the ad-hoc mode, the wireless network devices communicate directly with each other and do not employ an access point. The term client station or mobile station may not necessarily mean that a wireless network device is actually mobile. For example, a desktop computer that is not mobile may incorporate a wireless network device and operate as a mobile station or a client station. A wireless network that operates in the infrastructure mode includes an access point (AP) and at least one client station that communicates with the AP.

Referring now to FIG. 1, a first wireless network 10 is illustrated in an infrastructure mode. The first wireless network 10 includes one or more client stations 12 and one or more access points (AP) 14. The client station 12 and the AP 14 transmit and receive wireless signals 16. The AP 14 is a node in a network 18. The network 18 may be a local area network (LAN), a wide area network (WAN), or another network configuration. The network 18 may include other nodes such as a server 20 and may be connected to a distributed communications system 22 such as the Internet.

Referring now to FIG. 2, a second wireless network 24 operates in an ad-hoc mode. The second wireless network 24 includes multiple client stations 26-1, 26-2, and 26-3 that transmit and receive wireless signals 28. The client stations 26-1, 26-2, and 26-3 collectively form a LAN and communicate directly with each other.

To improve range, signal quality, and bandwidth, some wireless network devices may employ multiple transmit and receive antennas (i.e., an array of antennas). The network devices may steer the array of antennas based on feedback received from a target network device during operation to improve performance.

SUMMARY

A network device comprises a first feedback module and a first calibration module. The first feedback module selectively generates a first transmission schedule that is transmitted to a link partner, wherein the first transmission schedule includes a first matrix map. The first calibration module selectively transmits a first set of training signals to the link partner, receives a first set of channel state information (CSI) for the training signals from the link partner according to the first transmission schedule, and generates a first CSI matrix based on the first set of CSI and the first matrix map.

In another feature, the network device further comprises a first steering module, a first control module, and a first beamforming module. The first steering module generates a first steering matrix based on the first CSI matrix. The first control module adjusts beamforming weights of the network device based on the first steering matrix. The first beamforming module directs transmission of radio frequency (RF) signals toward the link partner based on the beamforming weights, wherein the beamforming weights determine gain of the RF signals.

In another feature, the first transmission schedule includes a first subcarrier schedule that determines an order of transmitting subcarriers of the RF signals, and the first matrix map determines a sequence for communicating elements of the first set of CSI that constitute elements of the first CSI matrix.

In another feature, the first calibration module generates the first set of training signals for each of the subcarriers and receives the first set of CSI for each of the subcarriers, wherein the first set of CSI includes signal to noise ratios (SNRs) of the subcarriers.

In another feature, the first feedback module determines correspondence between each of the subcarriers and the first CSI matrix for each of the subcarriers based on the first subcarrier schedule.

In still other features, a wireless network comprises the network device and further comprises the link partner, wherein the link partner includes a second calibration module that determines the first set of CSI for the first set of training signals, that generates the first CSI matrix based on the first set of CSI and the first matrix map, and that communicates the first set of CSI to the network device based on the first transmission schedule.

In another feature, the link partner further comprises a second feedback module that generates a second transmission schedule that is transmitted to the network device when the first feedback module does not generate the first transmission schedule, wherein the second transmission schedule includes a second matrix map.

In another feature, the first feedback module receives the second transmission schedule, and the first calibration module receives the first set of CSI from the link partner according to the second transmission schedule and generates the first CSI matrix based on the first set of CSI and the second matrix map.

In another feature, the second calibration module transmits a second set of training signals to the network device, and the first calibration module determines a second set of CSI for the second set of training signals and generates a second CSI matrix based on the second set of CSI and one of the first and second matrix maps.

In another feature, the second calibration module receives the second set of CSI from the network device according to one of the first and second transmission schedules and generates the second CSI matrix based on one of the first and second matrix maps.

In another feature, the link partner further comprises a second steering module, a second control module, and a second beamforming module. The second steering module generates a second steering matrix based on the second CSI matrix. The second control module adjusts beamforming weights of the link partner based on the second steering matrix. The second beamforming module directs transmission of radio frequency (RF) signals toward the network device based on the beamforming weights of the link partner, wherein the beamforming weights of the link partner determine gain of the RF signals.

In another feature, the second transmission schedule includes a second subcarrier schedule that determines an order of transmitting subcarriers of the RF signals, and the second matrix map determines a sequence for communicating elements of one of the first and second sets of CSI.

In another feature, the second calibration module generates the second set of training signals for each of the subcarriers and receives the second set of CSI for each of the subcarriers, wherein the second set of CSI includes signal to noise ratios (SNRs) of the subcarriers, and wherein elements of the second set of CSI constitute elements of the second CSI matrix.

In another feature, the first feedback module determines correspondence between each of the subcarriers and the second CSI matrix for each of the subcarriers based on the second subcarrier schedule.

In another feature, the network device parses a frame into a plurality of radio frequency (RF) signals and transmits the RF signals toward the link partner via $N_{TX}$ antennas, and the link partner receives the RF signals via $N_{RX}$ antennas, where $N_{TX}$ and $N_{RX}$ are integers greater than or equal to 1.

In another feature, the link partner parses a frame into a plurality of radio frequency (RF) signals and transmits the RF signals toward the network device via $N_{TX}$ antennas, and the network device receives the RF signals via $N_{RX}$ antennas, where $N_{TX}$ and $N_{RX}$ are integers greater than or equal to 1.

In another feature, the first and second CSI matrices are ($N_{TX} \times N_{RX}$) matrices, where $N_{TX}$ and $N_{RX}$ are integers greater than or equal to 1 and represent number of transmit and receive antennas, respectively.

In another feature, the network device further comprises a third steering module that generates a third steering matrix based on the second set of CSI according to one of the first and second matrix maps when the link partner does not include at least one of the second and third steering modules and does not generate the second steering matrix.

In another feature, the second control module adjusts the beamforming weights of the link partner based on the third steering matrix received from the network device according to one of the first and second transmission schedules.

In another feature, the third steering matrix is a ($N_{TX} \times N_{SS}$) matrix, where $N_{TX}$ is an integer greater than or equal to one and represents a number of transmit antennas and $N_{SS}$ is an integer greater than or equal to 1 and represents a number of spatial streams of a frame.

In another feature, the link partner receives the third steering matrix for each subcarrier of the RF signals, wherein the second feedback module determines correspondence between each subcarrier and the third steering matrix for each subcarrier based on one of the first and second transmission schedules.

In another feature, the link partner further comprises a third steering module that generates a third steering matrix based on the first set of CSI according to one of the first and second matrix maps when the network device does not include at least one of the second and third steering modules and does not generate the first steering matrix.

In another feature, the first control module adjusts the beamforming weights of the network device based on the third steering matrix received from the link partner according to one of the first and second transmission schedules.

In another feature, the third steering matrix is a ($N_{TX} \times N_{SS}$) matrix, where $N_{TX}$ is an integer greater than or equal to one and represents a number of transmit antennas and $N_{SS}$ is an integer greater than or equal to 1 and represents a number of spatial streams of a frame.

In another feature, the network device receives the third steering matrix for each subcarrier of radio frequency (RF) signals that the network device transmits toward the link partner, and the first feedback module determines correspondence between each subcarrier and the third steering matrix for each subcarrier based on one of the first and second transmission schedules.

In still other features, a method comprises selectively generating a first transmission schedule that includes a first matrix map, transmitting the first transmission schedule from a network device to a link partner, selectively transmitting a first set of training signals to the link partner, receiving a first set of channel state information (CSI) for the training signals from the link partner according to the first transmission schedule, and generating a first CSI matrix based on the first set of CSI and the first matrix map.

In another feature, the method further comprises generating a first steering matrix based on the first CSI matrix, adjusting beamforming weights of the network device based on the first steering matrix, and directing transmission of radio frequency (RF) signals toward the link partner based on the beamforming weights, wherein the beamforming weights determine gain of the RF signals.

In another feature, the method further comprises generating a first subcarrier schedule that determines an order of transmitting subcarriers of the RF signals and determining a sequence for communicating elements of the first set of CSI that constitute elements of the first CSI matrix based on the first matrix map.

In another feature, the method further comprises generating the first set of training signals for each of the subcarriers and receiving the first set of CSI for each of the subcarriers, wherein the first set of CSI includes signal to noise ratios (SNRs) of the subcarriers.

In another feature, the method further comprises determining correspondence between each of the subcarriers and the first CSI matrix for each of the subcarriers based on the first subcarrier schedule.

In another feature, the method further comprises determining the first set of CSI for the first set of training signals received by the link partner, generating the first CSI matrix based on the first set of CSI and the first matrix map, and communicating the first set of CSI to the network device based on the first transmission schedule.

In another feature, the method further comprises generating a second transmission schedule that includes a second matrix map and transmitting the second transmission schedule from the link partner to the network device when the network device does not generate the first transmission schedule.

In another feature, the method further comprises receiving the second transmission schedule, receiving the first set of CSI from the link partner according to the second transmission schedule, and generating the first CSI matrix based on the first set of CSI and the second matrix map.

In another feature, the method further comprises transmitting a second set of training signals to the network device, determining a second set of CSI for the second set of training signals received by the network device, and generating a second CSI matrix based on the second set of CSI and one of the first and second matrix maps.

In another feature, the method further comprises receiving the second set of CSI from the network device according to one of the first and second transmission schedules and generating the second CSI matrix based on one of the first and second matrix maps.

In another feature, the method further comprises generating a second steering matrix based on the second CSI matrix, adjusting beamforming weights of the link partner based on the second steering matrix, and directing transmission of radio frequency (RF) signals toward the network device based on the beamforming weights of the link partner, wherein the beamforming weights of the link partner determine gain of the RF signals.

In another feature, the method further comprises generating a second subcarrier schedule that determines an order of transmitting subcarriers of the RF signals and determining a sequence for communicating elements of one of the first and second sets of CSI based on the second matrix map.

In another feature, the method further comprises generating the second set of training signals for each of the subcarriers and receiving the second set of CSI for each of the subcarriers, wherein the second set of CSI includes signal to noise ratios (SNRs) of the subcarriers, and wherein elements of the second set of CSI constitute elements of the second CSI matrix.

In another feature, the method further comprises determining correspondence between each of the subcarriers and the second CSI matrix for each of the subcarriers based on the second subcarrier schedule.

In another feature, the method further comprises parsing a frame into a plurality of radio frequency (RF) signals, transmitting the RF signals toward the link partner via $N_{TX}$ antennas, and receiving the RF signals via $N_{RX}$ antennas, where $N_{TX}$ and $N_{RX}$ are integers greater than or equal to 1.

In another feature, the method further comprises parsing a frame into a plurality of radio frequency (RF) signals, transmitting the RF signals toward the network device via $N_{TX}$ antennas, and receiving the RF signals via $N_{RX}$ antennas, where $N_{TX}$ and $N_{RX}$ are integers greater than or equal to 1.

In another feature, the first and second CSI matrices are $(N_{TX} \times N_{RX})$ matrices, where $N_{TX}$ and $N_{RX}$ are integers greater than or equal to 1 and represent number of transmit and receive antennas, respectively.

In another feature, the method further comprises generating a third steering matrix based on the second set of CSI according to one of the first and second matrix maps when the link partner does not generate the second steering matrix.

In another feature, the method further comprises adjusting the beamforming weights of the link partner based on the third steering matrix received from the network device according to one of the first and second transmission schedules.

In another feature, the third steering matrix is a $(N_{TX} \times N_{SS})$ matrix, where $N_{TX}$ is an integer greater than or equal to 1 and represents a number of transmit antennas and $N_{SS}$ is an integer greater than or equal to 1 and represents spatial streams of a frame.

In another feature, the method further comprises receiving the third steering matrix for each subcarrier of the RF signals and determining correspondence between each subcarrier and the third steering matrix for each subcarrier based on one of the first and second transmission schedules.

In another feature, the method further comprises generating a third steering matrix based on the first set of CSI according to one of the first and second matrix maps when the network device does not generate the first steering matrix.

In another feature, the method further comprises adjusting the beamforming weights of the network device based on the third steering matrix received from the link partner according to one of the first and second transmission schedules.

In another feature, the third steering matrix is a $(N_{TX} \times N_{SS})$ matrix, where $N_{TX}$ is an integer greater than or equal to 1 and represents a number of transmit antennas and $N_{SS}$ is an integer greater than or equal to 1 and represents spatial streams of a frame.

In another feature, the method further comprises receiving the third steering matrix for each subcarrier of radio frequency (RF) signals that the network device transmits toward the link partner and determining correspondence between each subcarrier and the third steering matrix for each subcarrier based on one of the first and second transmission schedules.

In still other features, a network device comprises first feedback means for selectively generating a first transmission schedule that is transmitted to a link partner, wherein the first transmission schedule includes a first matrix map. The network device further comprises first calibration means for selectively transmitting a first set of training signals to the link partner, receiving a first set of channel state information (CSI) for the training signals from the link partner according to the first transmission schedule, and generating a first CSI matrix based on the first set of CSI and the first matrix map.

In another feature, the network device further comprises first steering means for generating a first steering matrix based on the first CSI matrix and first control means for adjusting beamforming weights of the network device based on the first steering matrix. The network device further comprise first beamforming means for directing transmission of radio frequency (RF) signals toward the link partner based on the beamforming weights, wherein the beamforming weights determine gain of the RF signals.

In another feature, the first transmission schedule includes a first subcarrier schedule that determines an order of transmitting subcarriers of the RF signals, and the first matrix map determines a sequence for communicating elements of the first set of CSI that constitute elements of the first CSI matrix.

In another feature, the first calibration means generates the first set of training signals for each of the subcarriers and receives the first set of CSI for each of the subcarriers, wherein the first set of CSI includes signal to noise ratios (SNRs) of the subcarriers.

In another feature, the first feedback means determines correspondence between each of the subcarriers and the first CSI matrix for each of the subcarriers based on the first subcarrier schedule.

In still other features, a wireless network comprises the network device and further comprises the link partner, wherein the link partner includes second calibration means for determining the first set of CSI for the first set of training signals, generating the first CSI matrix based on the first set of CSI and the first matrix map, and communicating the first set of CSI to the network device based on the first transmission schedule.

In another feature, the link partner further comprises second feedback means for generating a second transmission schedule that is transmitted to the network device when the first feedback means does not generate the first transmission schedule, wherein the second transmission schedule includes a second matrix map.

In another feature, the first feedback means receives the second transmission schedule, and the first calibration means receives the first set of CSI from the link partner according to the second transmission schedule and generates the first CSI matrix based on the first set of CSI and the second matrix map.

In another feature, the second calibration means transmits a second set of training signals to the network device, and the first calibration means determines a second set of CSI for the second set of training signals and generates a second CSI matrix based on the second set of CSI and one of the first and second matrix maps.

In another feature, the second calibration means receives the second set of CSI from the network device according to one of the first and second transmission schedules and generates the second CSI matrix based on one of the first and second matrix maps.

In another feature, the link partner further comprises second steering means for generating a second steering matrix based on the second CSI matrix and second control means for adjusting beamforming weights of the link partner based on the second steering matrix. The link partner further comprises second beamforming means for directing transmission of radio frequency (RF) signals toward the network device based on the beamforming weights of the link partner, wherein the beamforming weights of the link partner determine gain of the RF signals.

In another feature, the second transmission schedule includes a second subcarrier schedule that determines an order of transmitting subcarriers of the RF signals, and the second matrix map determines a sequence for communicating elements of one of the first and second sets of CSI.

In another feature, the second calibration means generates the second set of training signals for each of the subcarriers and receives the second set of CSI for each of the subcarriers, wherein the second set of CSI includes signal to noise ratios (SNRs) of the subcarriers, and wherein elements of the second set of CSI constitute elements of the second CSI matrix.

In another feature, the first feedback means determines correspondence between each of the subcarriers and the second CSI matrix for each of the subcarriers based on the second subcarrier schedule.

In another feature, the network device parses a frame into a plurality of radio frequency (RF) signals and transmits the RF signals toward the link partner via $N_{TX}$ antennas, and the link partner receives the RF signals via $N_{RX}$ antennas, where $N_{TX}$ and $N_{RX}$ are integers greater than or equal to 1.

In another feature, the link partner parses a frame into a plurality of radio frequency (RF) signals and transmits the RF signals toward the network device via $N_{TX}$ antennas and the network device receives the RF signals via $N_{RX}$ antennas, where $N_{TX}$ and $N_{RX}$ are integers greater than or equal to 1.

In another feature, the first and second CSI matrices are ($N_{TX} \times N_{RX}$) matrices, where $N_{TX}$ and $N_{RX}$ are integers greater than or equal to 1 and represent number of transmit and receive antennas, respectively.

In another feature, the network device further comprises third steering means for generating a third steering matrix based on the second set of CSI according to one of the first and second matrix maps when the link partner does not include at least one of the second and third steering means and does not generate the second steering matrix.

In another feature, the second control means adjusts the beamforming weights of the link partner based on the third steering matrix received from the network device according to one of the first and second transmission schedules.

In another feature, the third steering matrix is a ($N_{TX} \times N_{SS}$) matrix, where $N_{TX}$ is an integer greater than or equal to 1 and represents a number of transmit antennas and $N_{SS}$ is an integer greater than or equal to 1 and represents spatial streams of a frame.

In another feature, the link partner receives the third steering matrix for each subcarrier of the RF signals, wherein the second feedback means determines correspondence between each subcarrier and the third steering matrix for each subcarrier based on one of the first and second transmission schedules.

In another feature, the link partner further comprises third steering means for generating a third steering matrix based on the first set of CSI according to one of the first and second matrix maps when the network device does not include at least one of the second and third steering means and does not generate the first steering matrix.

In another feature, the first control means adjusts the beamforming weights of the network device based on the third steering matrix received from the link partner according to one of the first and second transmission schedules.

In another feature, the third steering matrix is a ($N_{TX} \times N_{SS}$) matrix, where $N_{TX}$ is an integer greater than or equal to 1 and represents a number of transmit antennas and $N_{SS}$ is an integer greater than or equal to 1 and represents spatial streams of a frame.

In another feature, the network device receives the third steering matrix for each subcarrier of radio frequency (RF) signals that the network device transmits toward the link partner, and the first feedback means determines correspondence between each subcarrier and the third steering matrix for each subcarrier based on one of the first and second transmission schedules.

In still other features, a computer program executed by a processor comprises selectively generating a first transmission schedule that includes a first matrix map, transmitting the first transmission schedule from a network device to a link partner, selectively transmitting a first set of training signals to the link partner, receiving a first set of channel state information (CSI) for the training signals from the link partner according to the first transmission schedule, and generating a first CSI matrix based on the first set of CSI and the first matrix map.

In another feature, the computer program further comprises generating a first steering matrix based on the first CSI matrix, adjusting beamforming weights of the network device based on the first steering matrix, and directing transmission of radio frequency (RF) signals toward the link partner based on the beamforming weights, wherein the beamforming weights determine gain of the RF signals.

In another feature, the computer program further comprises generating a first subcarrier schedule that determines an order of transmitting subcarriers of the RF signals and determining a sequence for communicating elements of the first set of CSI that constitute elements of the first CSI matrix based on the first matrix map.

In another feature, the computer program further comprises generating the first set of training signals for each of the subcarriers and receiving the first set of CSI for each of the subcarriers, wherein the first set of CSI includes signal to noise ratios (SNRs) of the subcarriers.

In another feature, the computer program further comprises determining correspondence between each of the subcarriers and the first CSI matrix for each of the subcarriers based on the first subcarrier schedule.

In another feature, the computer program further comprises determining the first set of CSI for the first set of training signals received by the link partner, generating the first CSI matrix based on the first set of CSI and the first matrix map, and communicating the first set of CSI to the network device based on the first transmission schedule.

In another feature, the computer program further comprises generating a second transmission schedule that includes a second matrix map and transmitting the second transmission schedule from the link partner to the network device when the network device does not generate the first transmission schedule.

In another feature, the computer program further comprises receiving the second transmission schedule, receiving the first set of CSI from the link partner according to the second transmission schedule, and generating the first CSI matrix based on the first set of CSI and the second matrix map.

In another feature, the computer program further comprises transmitting a second set of training signals to the network device, determining a second set of CSI for the second set of training signals received by the network device, and generating a second CSI matrix based on the second set of CSI and one of the first and second matrix maps.

In another feature, the computer program further comprises receiving the second set of CSI from the network device according to one of the first and second transmission schedules and generating the second CSI matrix based on one of the first and second matrix maps.

In another feature, the computer program further comprises generating a second steering matrix based on the second CSI matrix, adjusting beamforming weights of the link partner based on the second steering matrix, and directing transmission of radio frequency (RF) signals toward the network device based on the beamforming weights of the link partner, wherein the beamforming weights of the link partner determine gain of the RF signals.

In another feature, the computer program further comprises generating a second subcarrier schedule that determines an order of transmitting subcarriers of the RF signals and determining a sequence for communicating elements of one of the first and second sets of CSI based on the second matrix map.

In another feature, the computer program further comprises generating the second set of training signals for each of the subcarriers and receiving the second set of CSI for each of the subcarriers, wherein the second set of CSI includes signal to noise ratios (SNRs) of the subcarriers, and wherein elements of the second set of CSI constitute elements of the second CSI matrix.

In another feature, the computer program further comprises determining correspondence between each of the subcarriers and the second CSI matrix for each of the subcarriers based on the second subcarrier schedule.

In another feature, the computer program further comprises parsing a frame into a plurality of radio frequency (RF) signals, transmitting the RF signals toward the link partner via $N_{TX}$ antennas, and receiving the RF signals via $N_{RX}$ antennas, where $N_{TX}$ and $N_{RX}$ are integers greater than or equal to 1.

In another feature, the computer program further comprises parsing a frame into a plurality of radio frequency (RF) signals, transmitting the RF signals toward the network device via $N_{TX}$ antennas, and receiving the RF signals via $N_{RX}$ antennas, where $N_{TX}$ and $N_{RX}$ are integers greater than or equal to 1.

In another feature, the first and second CSI matrices are ($N_{TX} \times N_{RX}$) matrices, where $N_{TX}$ and $N_{RX}$ are integers greater than or equal to 1 and represent number of transmit and receive antennas, respectively.

In another feature, the computer program further comprises generating a third steering matrix based on the second set of CSI according to one of the first and second matrix maps when the link partner does not generate the second steering matrix.

In another feature, the computer program further comprises adjusting the beamforming weights of the link partner based on the third steering matrix received from the network device according to one of the first and second transmission schedules.

In another feature, the third steering matrix is a ($N_{TX} \times N_{SS}$) matrix, where $N_{TX}$ is an integer greater than or equal to 1 and represents a number of transmit antennas and $N_{SS}$ is an integer greater than 1 and represents spatial streams of a frame.

In another feature, the computer program further comprises receiving the third steering matrix for each subcarrier of the RF signals and determining correspondence between each subcarrier and the third steering matrix for each subcarrier based on one of the first and second transmission schedules.

In another feature, the computer program further comprises generating a third steering matrix based on the first set of CSI according to one of the first and second matrix maps when the network device does not generate the first steering matrix.

In another feature, the computer program further comprises adjusting the beamforming weights of the network device based on the third steering matrix received from the link partner according to one of the first and second transmission schedules.

In another feature, the third steering matrix is a ($N_{TX} \times N_{SS}$) matrix, where $N_{TX}$ is an integer greater than or equal to 1 and represents a number of transmit antennas and $N_{SS}$ is an integer greater than 1 and represents spatial streams of a frame.

In another feature, the computer program further comprises receiving the third steering matrix for each subcarrier of radio frequency (RF) signals that the network device transmits toward the link partner and determining correspondence between each subcarrier and the third steering matrix for each subcarrier based on one of the first and second transmission schedules.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
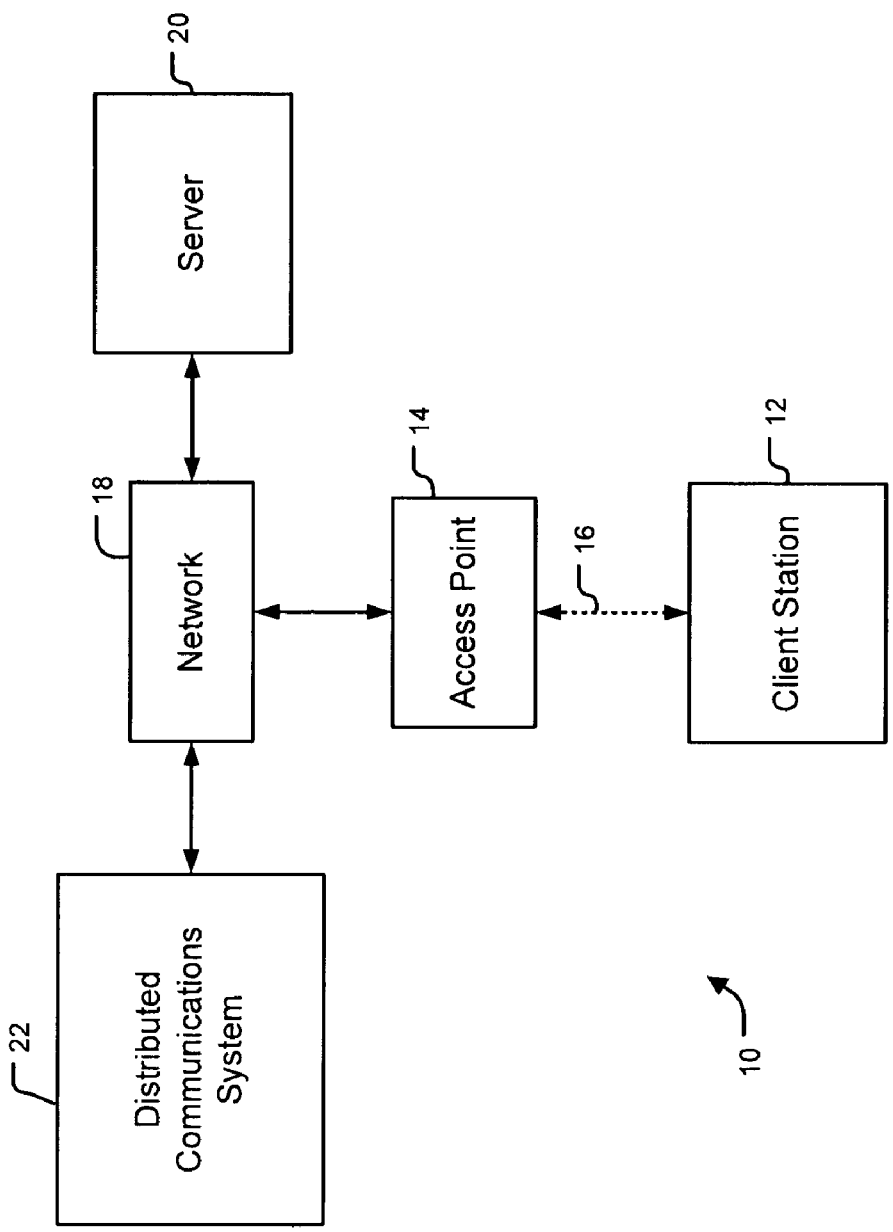
FIG. 1 is functional block diagram of a wireless network operating in an infrastructure mode.
Figure 2:
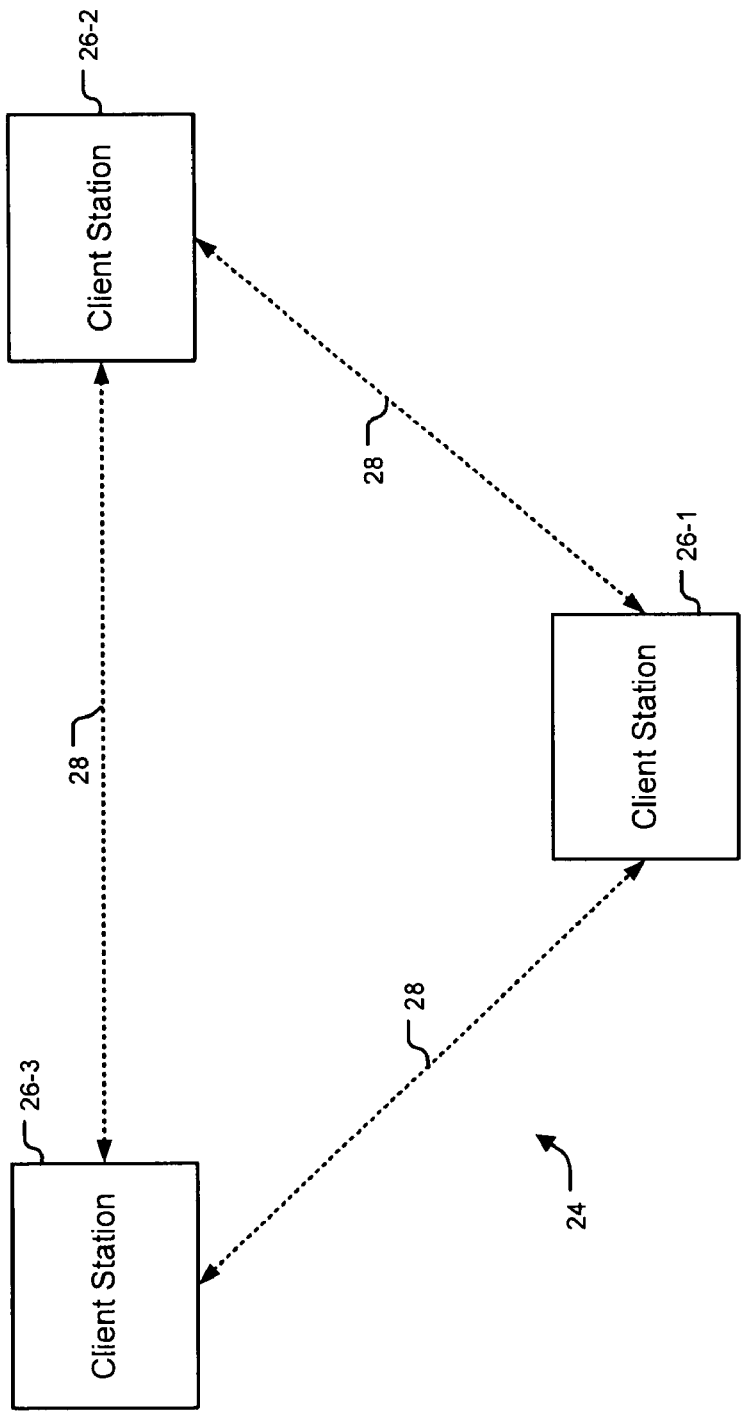
FIG. 2 is a functional block diagram of a wireless network operating in an ad-hoc mode.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Figure 3:
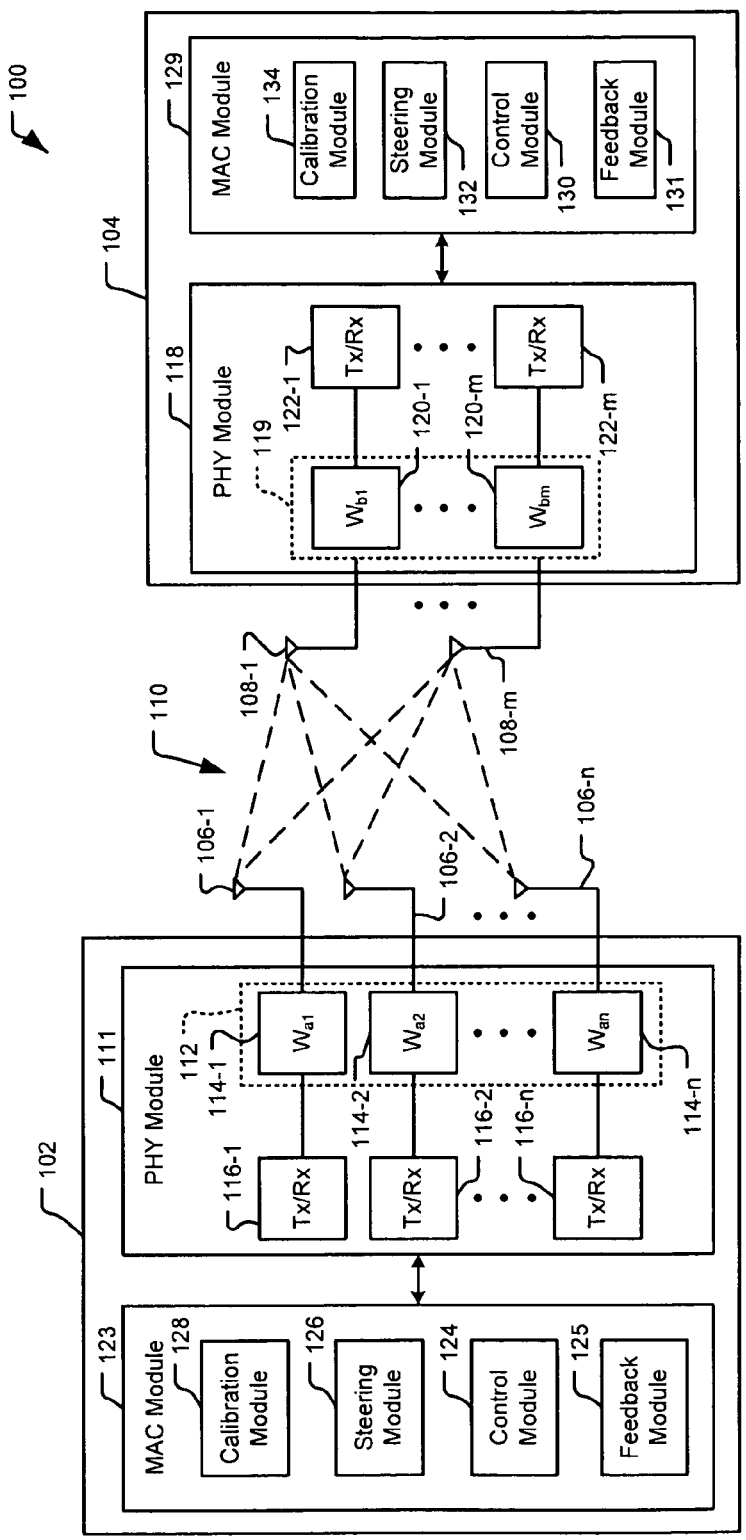
FIG. 3 is a functional block diagram of an exemplary multiple input multiple output (MIMO) wireless network.

Referring now to FIG. 3, an exemplary multiple input multiple output (MIMO) network as described in IEEE 802.11(n) draft specification (as proposed in Enhanced Wireless Consortium, HT PHY Specification v1.28, Jan. 2, 2006 and Enhanced Wireless Consortium, HT MAC Specification v1.28, Dec. 23, 2005), which is incorporated by reference in its entirety, is depicted at 100. A first device 102, such as an access point (AP) or a client station, may communicate with a second device 104, such as an AP or client station. When the first and second devices 102, 104 communicate with each other, they may be generally referred to as link partners.

The first and second devices 102 and 104 include physical layer (PHY) modules 111 and 118 and media access control (MAC) modules 123 and 129, respectively. The first device 102 may include a first set of antennas 106-1, 106-2, ..., and 106-n and the second device 104 may include a second set of antennas 108-1, ..., and 108-m. The first device 102 may parse a single frame into multiple spatial streams and then simultaneously transmit multiple RF signals 110 to the second device 104. The second device 104 may receive the multiple RF signals 110 and reassemble them into a single frame. Similarly, the second device 104 may simultaneously transmit multiple RF signals 110 to the first device 102, which may reassemble them into a single frame.

To increase transmission rates, the first 102 and second device 104 may utilize beamforming. Beamforming is a method to increase channel capacity, and consequently transmission rates, by increasing a signal to noise ratio of an RF signal. Beamforming combines RF signals from a set of small non-directional antennas to simulate a directional antenna. The combined RF signals can be pointed (or steered) in a particular direction to reduce noise and increase signal strength. When receiving a signal, beamforming can increase RF signal gain in the direction of wanted signals and decrease the gain in the direction of interference and noise. When transmitting a signal, beamforming can increase the gain in the direction that the signal is to be sent, which may be accomplished by creating beams and nulls in the radiation pattern.

The PHY module 111 includes a beamforming module 112 with a first set of adjustable weights 114-1, 114-2, ..., and 114-n. Each weight 114-1, 114-2, ..., and 114-n may be adjusted to manipulate signals received from a respective transceiver 116-1, 116-2, ..., and 116-n to collectively steer signals transmitted from antennas 106 in a particular direction. The weights 114-1, 114-2, ..., and 114-n are typically complex weights that include an amplitude and a phase shift portion. However, other weight configurations may be possible.

Similarly, the PHY module 118 includes a beamforming module 119 with a second set of adjustable weights 120-1, ..., and 120-m. Each weight 120-1, ..., and 120-m may be adjusted to manipulate signals received from a respective transceiver 122-1, ..., and 122-m to collectively steer signals transmitted from antennas 108 in a particular direction. The weights 120-1, ..., and 120-n are typically complex weights that include an amplitude and a phase shift portion. However, other weight configurations may be possible. To adjust the weights 114 and 120, the first and second devices 102, 104 may use channel state information (CSI) feedback. The CSI feedback may include a signal to noise ratio for each subcarrier of the RF signal 110.

The MAC module 123 includes a control module 124, a feedback module 125, a steering module 126, and a calibration module 128. The control module 124, feedback module 125, steering module 126, and calibration module 128 may be implemented individually and/or combined into one or more modules. The MAC module 123 may communicate with the PHY module 111. In some embodiments, the calibration module 128 may communicate with RF transceivers 116, the steering module 126 may communicate with the calibration module 128 and the control module 124, and the control module 124 may communicate with the beamforming module 112.

The MAC module 129 includes a second control module 130, a second feedback module 131, a second steering module 132, and a second calibration module 134. The MAC module 129 may communicate with the PHY module 118. In some embodiments, the second calibration module 134 may communicate with RF transceivers 122, the second steering module 132 may communicate with the second calibration module 134 and the second control module 130, and the second control module 130 may communicate with the beamforming module 119.

The first device 102 may obtain CSI from the second device 104 and adjust the weights 114 based thereon. More specifically, the calibration module 128 may generate and transmit a set of training signals for each subcarrier to the second device 104. The second calibration module 134 may determine CSI of the training signals and then transmit a CSI matrix for each subcarrier that includes CSI for each training signal. When the first device 102 receives the CSI matrix, the steering module 126 may generate a steering matrix based on the CSI matrix. The control module 124 may adjust the weights 114 based on the steering matrix to direct the RF signals 110 toward the second device 104.

The CSI matrix is typically a $N_{RX} \times N_{TX}$ matrix, where $N_{RX}$ is the number of receive antennas and $N_{TX}$ is the number of transmit antennas. The CSI matrix may be generally represented as follows:

$$\begin{bmatrix} c_{11} & c_{12} & \cdots & c_{1n} \\ \vdots & \vdots & \vdots & \vdots \\ c_{m1} & c_{m2} & \cdots & c_{mn} \end{bmatrix}$$

where $c_{11}$ to $c_{mn}$ represent CSI elements for a subcarrier of the RF signals 110.

The first device 102 receives the RF signals 110 that include CSI matrices for each subcarrier. The feedback module 125 determines which CSI matrix corresponds to which subcarrier based on a transmission schedule. The transmission schedule may include a subcarrier schedule for the subcarriers of each RF signal 110. For example, the CSI matrix for a first subcarrier may be transmitted first, the CSI matrix for a second subcarrier may be transmitted second, the CSI matrix for a third subcarrier may be transmitted third, etc. The first subcarrier may be a subcarrier that operates at a lowest frequency of the RF signals 110. Alternatively, the first subcarrier may be a subcarrier that operates at a highhest frequency of the RF signals 110. The first, second, third, etc. subcarriers may be adjacent. In addition, the first, second, third, etc. subcarriers may be consecutive.

The transmission schedule also includes a particular sequence (or matrix map) in which the CSI elements are communicated. The matrix elements may be communicated row by row or column by column. The elements may be communicated from left to right, top to bottom (e.g., $c_{11}, c_{12}, \ldots, c_{1n}, \ldots, c_{m1}, c_{m2}, \ldots, c_{mn}$). The elements may also be communicated from top to bottom, left to right (e.g., $c_{11}, \ldots, c_{m1}, c_{12}, \ldots, c_{1n}, \ldots, c_{m2}, \ldots, c_{mn}$). Other variations of sequences in which the elements may be communicated include, but are not limited to: right to left, top to bottom; left to right, bottom to top; right to left, bottom to top; top to bottom, right to left; bottom to top, left to right; and bottom to top, right to left. When the receiving device receives the elements, it may map the elements based on the matrix map to reassemble the CSI matrix.

The transmission schedule may be predetermined or it may be determined by the feedback module 125, 131 of the first or second device 102, 104, respectively. If the transmission schedule is not predetermined, the feedback module 125 of the first device 102 may determine the transmission schedule. The first device 102 may transmit a CSI schedule frame that includes the transmission schedule to the second device 104 prior to transmitting the training signals. The second device 104 may then transmit the CSI matrix elements according to the transmission schedule determined by the feedback module 125 of the first device 102. When the first device 102 receives the CSI matrix elements, it may map the elements based on the matrix map to reassemble the CSI matrix.

Alternatively, the feedback module 131 of the second device 104 may determine the transmission schedule. The second device 104 may transmit a CSI schedule frame that includes the transmission schedule to the first device 102 prior to transmitting the CSI matrix. The second device 104 may then transmit the CSI matrix according to the transmission schedule determined by the feedback module 131 of the second device 104. When the first device 102 receives the CSI matrix elements, it may map the elements based on the matrix map to reassemble the CSI matrix.

In addition, the second device 104 may obtain CSI from the first device 102 and adjust the second set of weights 120 based thereon. More specifically, the second calibration module 134 may generate and transmit a set of training signals to the first device 102. The calibration module 128 of the first device 102 may determine CSI of the training signals and then transmit a CSI matrix that includes CSI for each training signal to the second device 104 according to the transmission schedule. When the second device 104 receives the CSI matrix, the second steering module 132 may generate a steering matrix based on the CSI matrix. The second control module 130 may adjust the second set of weights 120 based on the steering matrix to direct the RF signals 110 toward the first device 102.

Figure 4:
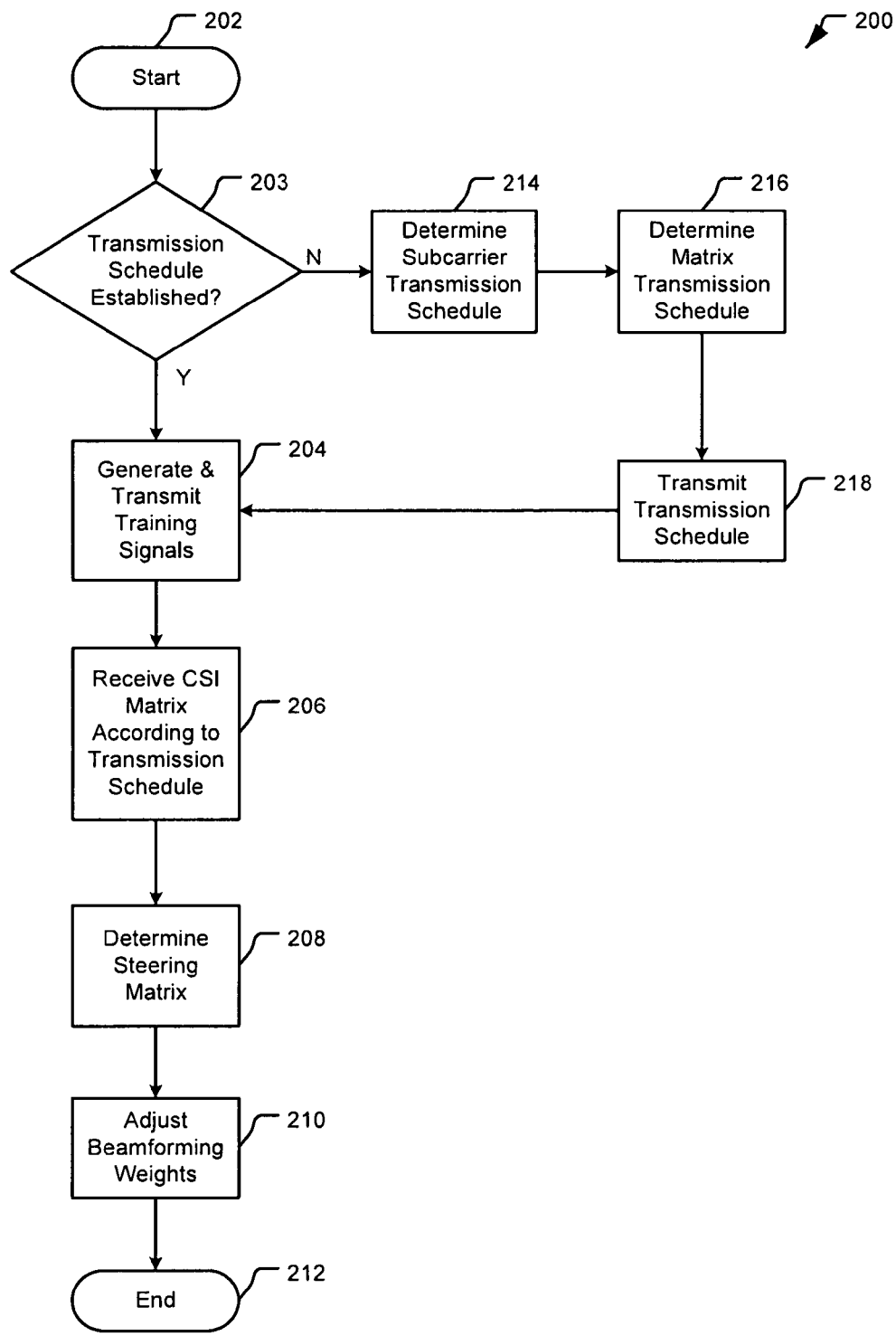
FIG. 4 is a flowchart illustrating exemplary steps that may be implemented to adjust beamforming weights associated with a network device.

Referring now to FIG. 4, exemplary steps that may be implemented to adjust the first set of weights 114 are generally depicted at 200. The process starts in step 202 when the first device 102 has data to transmit to the second device 104. In step 203, the feedback module 125 determines whether a transmission schedule has been established. As previously discussed, the transmission schedule may be predetermined or it may be determined by the feedback module 125, 131 of first or second device 102, 104, respectively.

If the transmission schedule has been established, the calibration module 128 may generate and transmit training signals to the second device 104 in step 204. In step 206, the calibration module 128 may receive a CSI matrix according to the transmission schedule from the second device 104. The steering module 126 may determine a steering matrix based on the CSI matrix in step 208. Once the steering matrix has been determined, the control module 124 may adjust the first set of weights 114 based on the steering matrix in step 210 and the process ends in step 212.

If the feedback module 125 determines that the transmission schedule has not been determined in step 203, the feedback module 125 may determine a subcarrier schedule for the transmission schedule in step 214. The feedback module 125 may determine a matrix map for the transmission schedule in step 216. Once the transmission schedule has been determined, the first device 102 may transmit the transmission schedule to the second device 104 in step 218 and the process may proceed to step 204.

Figure 5:
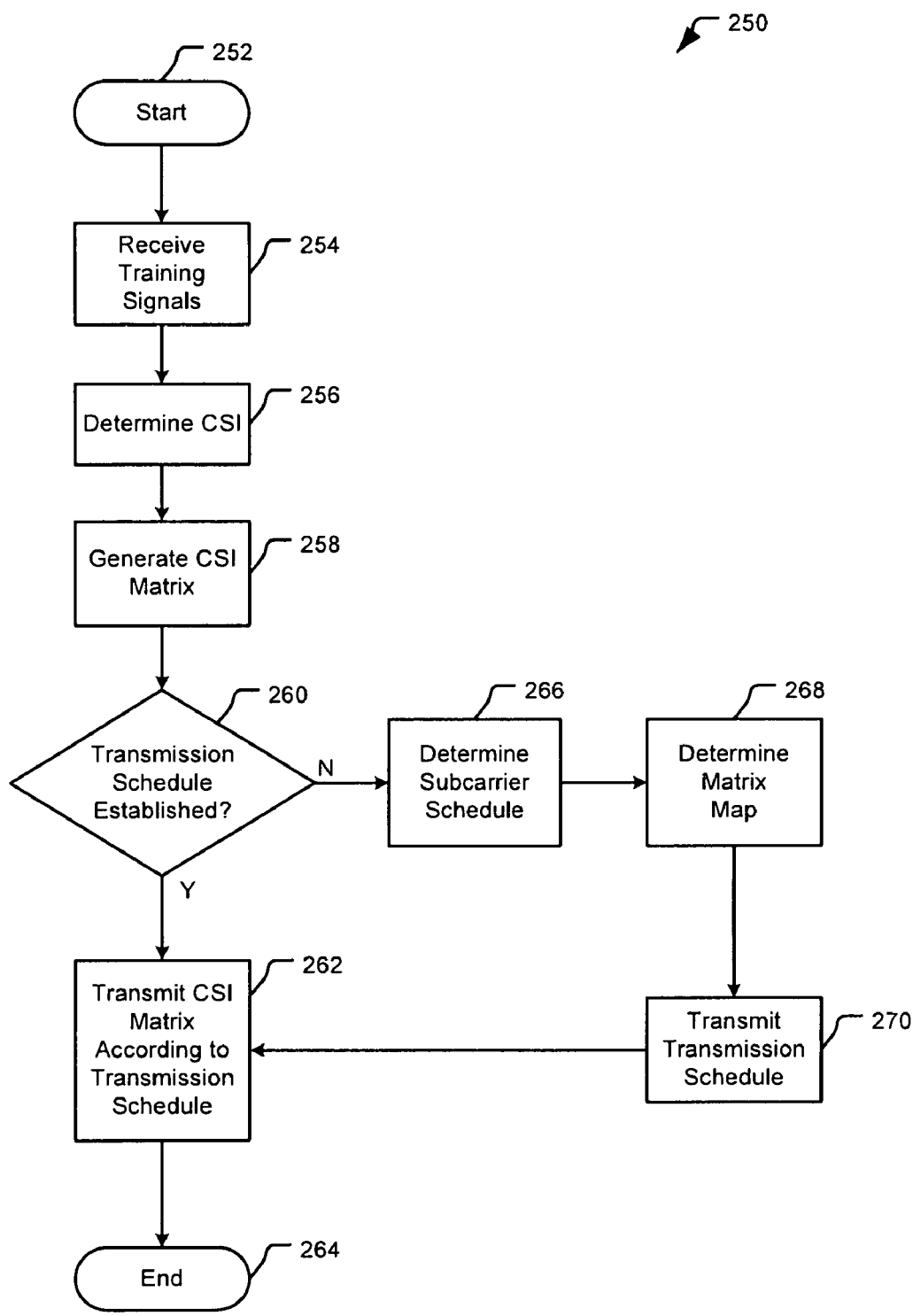
FIG. 5 is a flowchart illustrating exemplary steps that may be implemented to provide channel state information (CSI) feedback to the network device.

Referring now to FIG. 5, exemplary steps taken to provide CSI feedback are generally depicted at 250. The process begins in step 252 when the first device 102 has data to transmit to the second device 104. In step 254, the second calibration module 134 may receive training signals from the first device 102. In step 256, the second calibration module 134 determines the CSI of the training signals. In step 258, the second calibration module 134 may generate the CSI matrix to be transmitted to the first device 102.

In step 260, the second feedback module 131 may determine whether a transmission schedule has been established. If the transmission schedule has been established, the second device 104 may transmit the CSI matrix according to the transmission schedule in step 262 and the process may end in step 264.

However, if the transmission schedule has not been established, the second feedback module 131 may determine a subcarrier schedule for the transmission schedule in step 266. In step 268, the second feedback module 131 may determine a matrix map for the transmission schedule. Once the transmission schedule has been determined, the second device 104 may transmit the transmission schedule to the first device 102 in step 270. Once the transmission schedule has been established, the second device 104 may transmit the CSI matrix to the first device 102 according to the transmission schedule in step 262 and the process may end in step 264.

Figure 6:
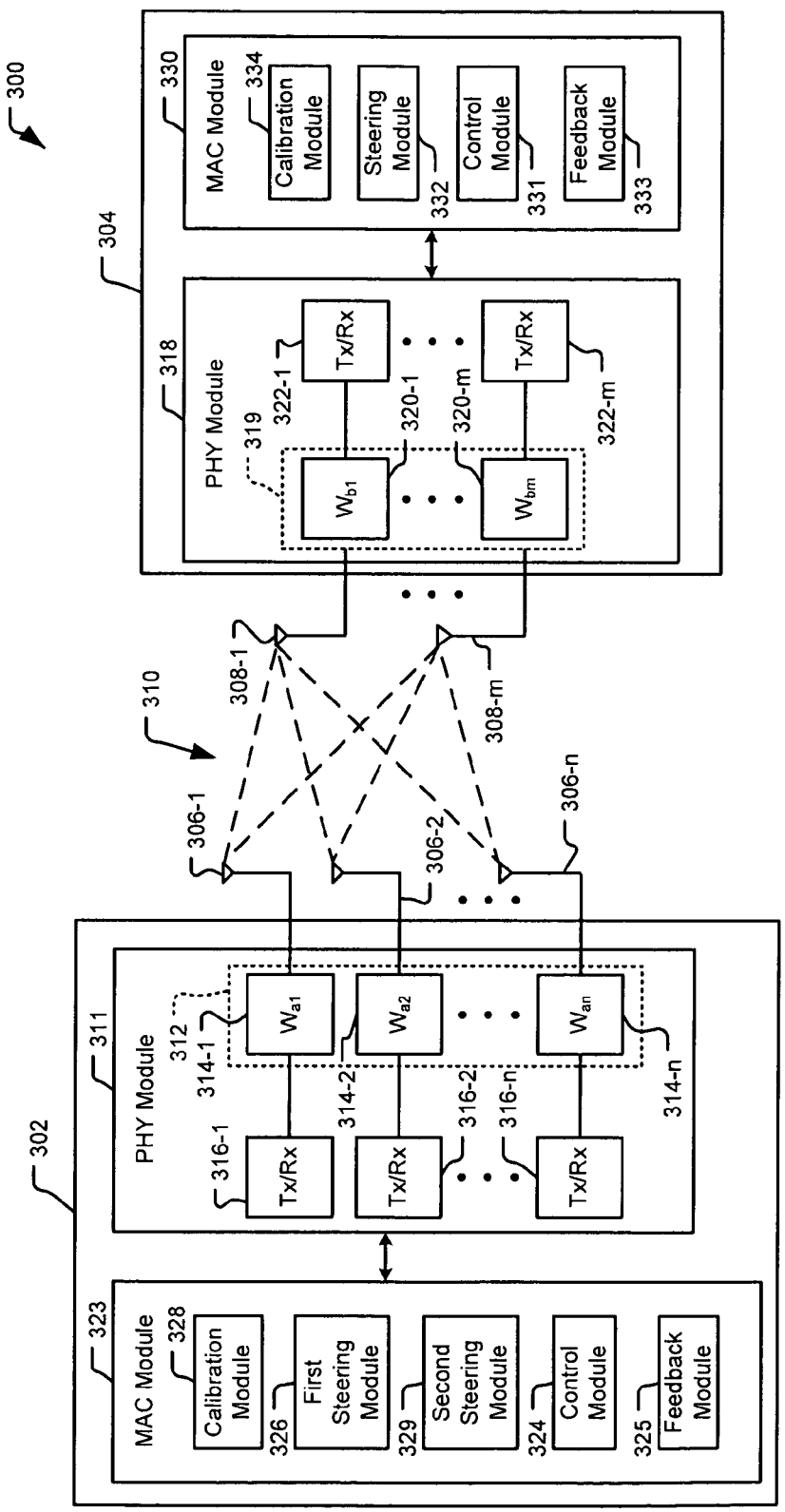
FIG. 6 is a functional block diagram of an exemplary multiple input multiple output (MIMO) wireless network that has primary and secondary network devices.

Referring now to FIG. 6, some MIMO networks 300 may be configured to have a primary device 302, such as an AP or a master client station, and a secondary device 304, such as a client station or a slave client station that communicate with each other as link partners. The primary device 302 may be capable of processing more data than the secondary device 304. Therefore, the primary device 302 may determine a steering matrix for the secondary device 304 when the devices are compatible. The devices are compatible when the primary device 302 is capable of determining a steering matrix for the secondary device 304 and the secondary device 304 is capable of adjusting the weights 320 based on the steering matrix. Since the secondary device 304 does not have to determine a steering matrix it may consume less power, which is advantageous for battery powered devices.

The primary device 302 device may include a set of primary antennas 306-1, 306-2, . . . , and 306-n and the secondary device 304 may include a set of secondary antennas 308-1, . . . , and 308-m. The primary device 302 may parse a single frame into multiple spatial streams and then simultaneously transmit multiple RF signals 310 to the secondary device 304. The secondary device 304 may receive the multiple RF signals 310 and reassemble them into a single frame. Similarly, the secondary device 304 may simultaneously transmit multiple RF signals 310 to the primary device 302, which may then receive and reassemble the RF signals 310 into a single frame.

The primary device 302 may include a PHY module 311 that includes a primary beamforming module 312 with an adjustable set of primary weights 314-1, 314-2, . . . , and 314-n. Each primary weight 314-1, 314-2, . . . , and 314-n may be adjusted to manipulate signals received from a respective primary transceiver 316-1, 316-2, . . . , and 316-n to collectively steer the RF signals transmitted from primary antennas 306 in a particular direction. The primary weights 314-1, 314-2, . . . , and 314-n are typically complex weights that include an amplitude and a phase shift portion. However, other weight configurations may be possible.

Similarly, the secondary device 304 may include a PHY module 318 that includes a secondary beamforming module 319 with an adjustable set of secondary weights 320-1, . . . , and 320-m. Each secondary weight 320-1, . . . , and 320-m may be adjusted to manipulate signals received from a respective secondary transceiver 322-1, . . . , and 322-m to collectively steer the RF signals transmitted by secondary antennas 308 in a particular direction. The secondary weights 320-1, . . . , and 320-n are typically complex weights that include an amplitude and a phase shift portion. However, other weight configurations may be possible. To adjust the primary and secondary weights 314 and 320, the primary and secondary devices 302, 304 may use channel state information (CSI) feedback. The CSI feedback may include a signal to noise ratio for each RF signal 310.

The primary device 302 may include a MAC module 323 that includes a primary control module 324, a primary feedback module 325, a first steering module 326, a primary calibration module 328, and a second steering module 329. The primary control module 324, primary feedback module 325, first steering module 326, primary calibration module 328, and second steering module 329 may be implemented individually and/or combined into one or more modules. The MAC module 323 may communicate with the PHY module 311. In some embodiments, the primary calibration module 328 may communicate with the RF transceivers 316 and the second steering module 329, the first steering module 326 may communicate with the primary calibration module 328 and the primary control module 324, and the primary control module 324 may communicate with the primary beamforming module 312.

The secondary device 304 may include a MAC module 330 that may include a secondary control module 331, a secondary steering module 332, a secondary feedback module 333, and a secondary calibration module 334. The MAC module 330 may communicate with the PHY module 318. In some embodiments, the secondary calibration module 334 may communicate with the RF transceivers 322 and the secondary control module 331, the secondary steering module 332 may communicate with the secondary calibration module 334 and the secondary control module 331, and the secondary control module 331 may communicate with the secondary beamforming module 319.

The primary device 302 may obtain CSI from the secondary device 304 and adjust the primary weights 314 based thereon. More specifically, the primary calibration module 328 may generate and transmit a set of training signals for each subcarrier to the second device 304. The training signals may include a management action frame that indicates whether the primary device 302 is capable of determining a steering matrix for the secondary device 304 based on a CSI matrix. In some embodiments, the secondary device 304 may not be capable of determining a steering matrix based on a CSI matrix when in a power save mode. In other embodiments, the secondary device 304 may not include the secondary steering module 332 and therefore would not be capable of determining a steering matrix based on a CSI matrix.

The secondary calibration module 334 may determine CSI of the training signals and then transmit a CSI matrix for each subcarrier that includes CSI for each training signal. When the primary device 302 receives the CSI matrix, the first steering module 326 may generate a steering matrix based on the CSI matrix. The primary control module 324 may adjust the primary weights 314 based on the steering matrix to direct the RF signals 110 toward the secondary device 304.

The secondary device 304 may obtain data from the primary device 302 and adjust the secondary weights 320 based thereon. More specifically, the secondary calibration module 334 may generate and transmit a set of training signals for each subcarrier to the primary device 302. The training signals may include a management action frame that indicates whether the secondary device 304 is capable of adjusting the secondary weights 320 based on a steering matrix received from the primary device 302. As previously mentioned, in some embodiments the secondary device 304 may not be capable of determining a steering matrix based on a CSI matrix when in a power save mode. In other embodiments, the secondary device 304 may not include the secondary steering module 332 and therefore would not be capable of determining a steering matrix based on a CSI matrix.

If the secondary device 304 is not capable of adjusting the secondary weights 320 based on a steering matrix received from the primary device 302, the primary calibration module 328 may determine CSI of the training signals and then transmit a CSI matrix for each subcarrier that includes CSI for each training signal. When the secondary device 304 receives the CSI matrix, the secondary steering module 332 may generate a steering matrix based on the CSI matrix. The secondary control module 331 may adjust the secondary weights 320 based on the steering matrix to direct the RF signals 310 toward the primary device 302.

However, if the secondary device 304 is capable of adjusting the secondary weights 320 based on a steering matrix received from the primary device 302, the primary calibration module 328 may determine CSI of the training signals. The second steering module 329 of the primary device 302 may then determine a steering matrix for the secondary device 304 based on the CSI matrix. The primary calibration module 328 may then transmit the steering matrix determined by the second steering module 329 to the secondary device 304. When the secondary device 304 receives the steering matrix, the secondary control module 331 may adjust the secondary weights 320 based on the received steering matrix to direct the RF signals 310 toward the primary device 302.

The steering matrix is typically a $N_{TX} \times N_{SS}$ matrix, where $N_{TX}$ is the number of transmit antennas and $N_{SS}$ is the number of spatial streams that a single frame is parsed into. The steering matrix may be generally represented as follows:

$$\begin{bmatrix} s_{11} & s_{12} & \cdots & s_{1y} \\ \vdots & \vdots & \vdots & \vdots \\ s_{x1} & s_{x2} & \cdots & s_{xy} \end{bmatrix}$$

where $s_{11}$ to $s_{xy}$ represent steering matrix elements.

The secondary device 304 receives the RF signals 110 that include the steering matrix. The feedback module 333 determines which steering matrix corresponds to which subcarrier based on a transmission schedule. The transmission schedule may include a subcarrier schedule for the subcarriers of each RF signal 110. For example, the steering matrix based on a first subcarrier may be transmitted first, the steering matrix based on a second subcarrier may be transmitted second, the steering matrix based on a third subcarrier may be transmitted third, etc. The first subcarrier may be a subcarrier that operates at a lowest frequency of the RF signals 110. Alternatively, the first subcarrier may be a subcarrier that operates at a highest frequency of the RF signals 110. The first, second, third, etc. subcarriers may be adjacent. In addition, the first, second, third, etc. subcarriers may be consecutive.

The transmission schedule also includes a particular sequence (matrix map) in which the steering matrix elements are communicated. The matrix element may be communicated row by row or column by column. The elements may be communicated from left to right, top to bottom (e.g., $s_{11}$, $S_{12}, \ldots, S_{1y}, \ldots, s_{x1}, s_{x2}, \ldots, s_{xy}$). The elements may also be communicated from top to bottom, left to right (e.g., $s_{11}, \ldots, s_{x1}, s_{12} \ldots, s_{1y}, \ldots, s_{x2}, \ldots, s_{xy}$). Other variations of sequences in which the elements may be communicated include, but are not limited to: right to left, top to bottom; left to right, bottom to top; right to left, bottom to top; top to bottom, right to left; bottom to top, left to right; and bottom to top, right to left. When the receiving device receives the elements, it may map the elements based on the matrix map to reassemble the steering matrix.

The transmission schedule may be predetermined or it may be determined by the feedback module 325, 333 of the primary or secondary device 302, 304, respectively. If the transmission schedule is not predetermined, the primary feedback module 325 of the primary device 302 may determine the transmission schedule. The secondary device 304 may transmit a steering matrix schedule frame that includes the transmission schedule to the primary device 302 prior to transmitting the training signals. The primary device 302 may then transmit the steering matrix according to the transmission schedule determined by the secondary feedback module 333. When the secondary device 304 receives the steering matrix elements, it may map the elements based on the matrix map to reassemble the steering matrix.

Alternatively, the primary feedback module 325 may determine the transmission schedule. The primary device 302 may transmit a steering matrix schedule frame that includes the transmission schedule prior to transmitting the steering matrix matrix. The primary device 302 may then transmit the steering matrix according to the transmission schedule determined by the primary feedback module 325. When the secondary device 304 receives the steering matrix elements, it may map the elements based on the matrix map to reassemble the steering matrix.

Figure 7:
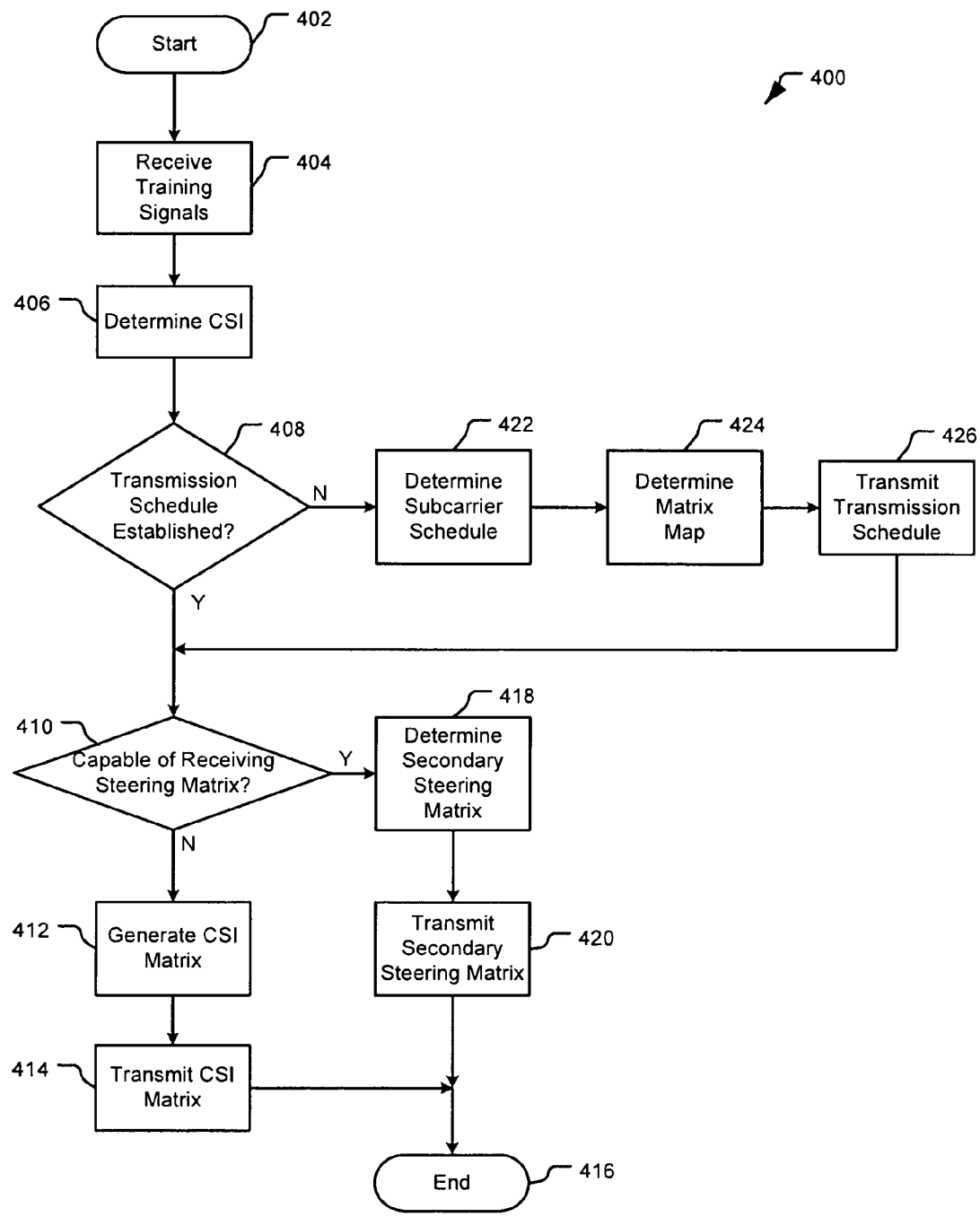
FIG. 7 is a flowchart illustrating exemplary steps that may be implemented by the primary network device in communicating with the secondary network device according to the present disclosure.

Referring now to FIG. 7, the primary device 302 may implement steps generally identified at 400 to communicate with the secondary device 304. The process begins in step 402 when the secondary device 304 has data to transmit to the primary device 302. In step 404, the primary device 302 receives training signals from the secondary device 304. As previously mentioned, the training signals may include a management action frame that indicates whether the secondary device 304 is capable of adjusting the secondary weights 320 based on a steering matrix generated by the primary device 302. The primary calibration module 328 may determine CSI of the training signals in step 406.

In step 408, the primary feedback module 325 determines whether a transmission schedule has been established. As previously discussed, the transmission schedule may be predetermined or it may be determined by the primary or secondary feedback module 325, 333.

If the transmission schedule has been established, the primary calibration module 328 may inspect the management action frame and determine whether the secondary device 304 is capable of receiving a steering matrix from the primary device 302 in step 410. If the secondary device 304 is not capable of receiving a steering matrix from the primary device 302, the primary calibration device 328 generates a CSI matrix in step 412. The CSI matrix may be transmitted to the secondary device 304 in step 414, and the process may end in step 414.

However, if the secondary device 304 is capable of receiving the steering matrix from the primary device 302, the secondary steering module 323 of the primary device 302 may determine a steering matrix for the secondary device 304 in step 418. In step 420, the primary calibration module 328 may transmit the steering matrix to the secondary device 304, and the process may end in step 416.

If the primary feedback module 325 determines in step 408 that the transmission schedule has not been established, the primary feedback module 325 may determine a subcarrier schedule for the transmission schedule in step 422. In step 424, the primary feedback module 325 may determine a matrix map for the transmission schedule. Once the transmission schedule has been determined, the primary device 302 may transmit the transmission schedule to the secondary device 304 in step 426, and the process may proceed to step 410.

Figure 8:
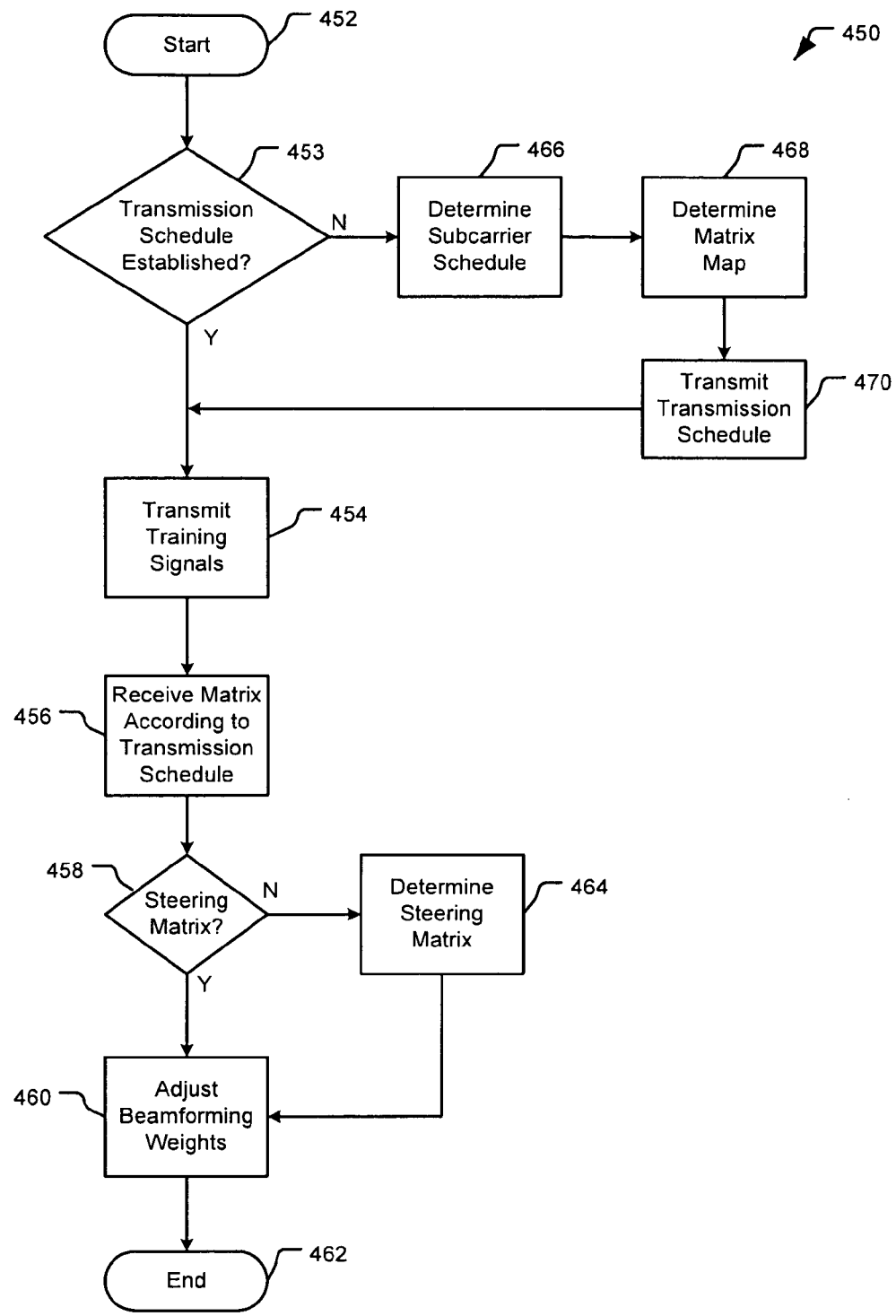
FIG. 8 is a flowchart illustrating exemplary steps that may be implemented by the secondary network device in communicating with the primary network device according to the present disclosure.

Referring now to FIG. 8, the secondary device 304 may implement steps generally identified at 450 to communicate with the primary device 302. The process begins in step 452 when the secondary device 304 has data to transmit to the primary device 302. In step 453, the secondary feedback module 333 determines whether a transmission schedule has been established. As previously discussed, the transmission schedule may be predetermined or it may be determined by the primary or secondary feedback module 325, 333.

If the transmission schedule has been established, the secondary device 304 transmits training signals to the primary device 302 in step 454. As previously mentioned, the training signals may include a management action frame that indicates whether the secondary device 304 is capable adjusting the secondary weights 320 based on a steering matrix generated by the primary device 302.

The secondary calibration module 334 may receive a matrix based on the training signals from the primary device 302 in step 456. In step 458, the secondary calibration module 334 may determine whether the matrix received from the primary device 302 is a steering matrix. If the matrix is a steering matrix, the secondary control module 331 may adjust the secondary weights 320 based on the steering matrix in step 460, and the process may end in step 462.

However, if the matrix received from the primary device 302 is not a steering matrix, the secondary steering module 332 may determine a steering matrix based on the matrix received from the primary device 302 in step 464. The secondary control module 331 may then adjust the secondary weights 320 based on the steering matrix in step 460, and the process may end in step 462.

If the secondary feedback module 325 determines that a transmission schedule has not been established in step 453, the secondary feedback module 333 may determine a subcarrier schedule for the transmission schedule in step 466. In step 468, the secondary feedback module 333 may determine a matrix map for the transmission schedule. Once the transmission schedule has been determined, the secondary device 304 may transmit the transmission schedule to the primary device 302 in step 470, and the process may proceed to step 454.

Figure 9A:
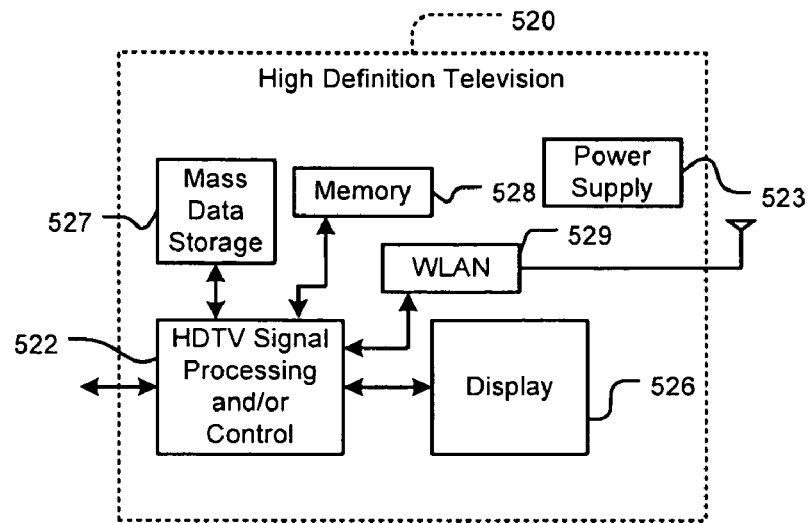
FIG. 9A is a functional block diagram of a high definition television.

Referring now to FIGS. 9A-9E, various exemplary implementations of the systems and methods disclosed in the present disclosure (hereinafter systems and methods) are shown. Referring now to FIG. 9A, the systems and methods can be implemented in a WLAN interface 529 of a high definition television (HDTV) 520. The HDTV 520 receives HDTV input signals in either a wireline or a wireless format and generates HDTV output signals for a display 526. In some implementations, the signal processing circuit and/or a control circuit 522 and/or other circuits (not shown) of the HDTV 520 may process data, perform coding and/or encryption, perform calculations, format data, and/or perform any other type of processing that the HDTV 520 may require.

The HDTV 520 may communicate with a mass data storage 527 that stores data in a nonvolatile manner. The mass data storage 527 may include magnetic storage devices such as hard disk drives (HDDs) and/or optical storage devices such as digital versatile disk (DVD) drives. The HDTV 520 may be connected to memory 528 such as RAM, ROM, low latency nonvolatile memory such as flash memory, and/or other suitable electronic data storage. The HDTV 520 may include a power supply 523. The HDTV 520 may support connections to a WLAN via the WLAN interface 529.

Figure 9B:
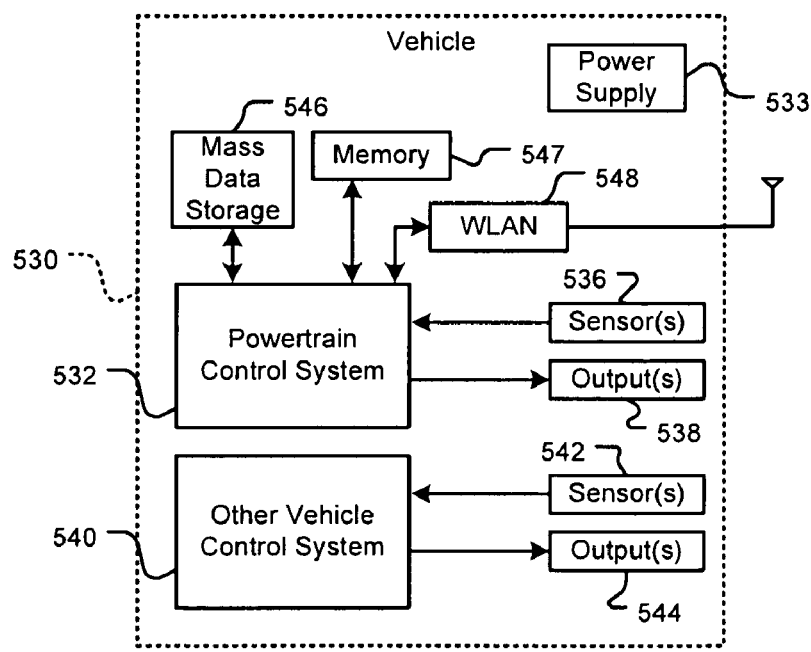
FIG. 9B is a functional block diagram of a vehicle control system.

Referring now to FIG. 9B, the systems and methods may be implemented in a WLAN interface 548 of a vehicle 530. A powertrain control system 532 receives inputs from one or more sensors 536 such as temperature sensors, pressure sensors, rotational sensors, airflow sensors, and/or any other suitable sensors. The powertrain control system 532 generates one or more output control signals 538 such as engine operating parameters, transmission operating parameters, and/or other control signals.

The systems and methods may also be implemented in other control systems 540 of the vehicle 530. The control system 540 may likewise receive signals from input sensors 542 and/or output control signals to one or more output devices 544. In some implementations, the control system 540 may be part of an anti-lock braking system (ABS), a navigation system, a telematics system, a vehicle telematics system, a lane departure system, an adaptive cruise control system, a vehicle entertainment system such as a stereo, a DVD, a compact disc system, etc. Still other implementations are contemplated.

The powertrain control system 532 may communicate with a mass data storage 546 that stores data in a nonvolatile manner. The mass data storage 546 may include magnetic storage devices such as hard disk drives (HDDs) and/or optical storage devices such as digital versatile disk (DVD) drives. The powertrain control system 532 may be connected to memory 547 such as RAM, ROM, low latency nonvolatile memory such as flash memory and/or other suitable electronic data storage. The powertrain control system 532 may support connections to a WLAN via the WLAN interface 548. Vehicle 530 may also include a power supply 533.

Figure 9C:
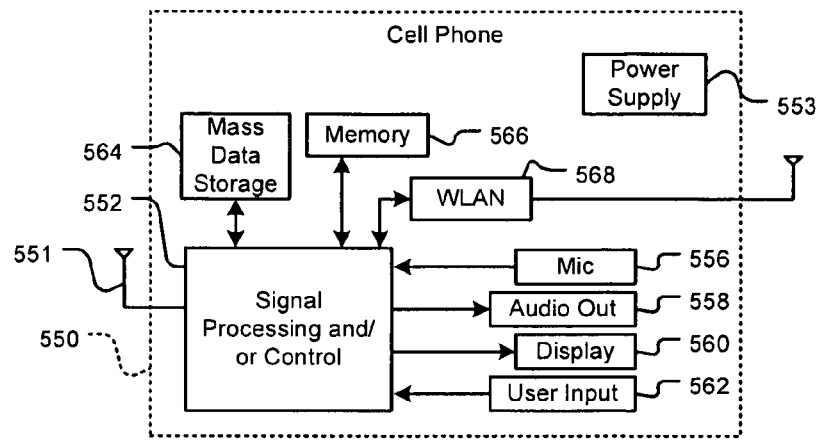
FIG. 9C is a functional block diagram of a cellular phone.

Referring now to FIG. 9C, the systems and methods can be implemented in a WLAN interface 568 of a cellular phone 550 that may include a cellular antenna 551. In some implementations, the cellular phone 550 may include a microphone 556, an audio output 558 such as a speaker and/or audio output jack, a display 560, and/or an input device 562 such as a keypad, a pointing device, and/or other input device. The signal processing and/or control circuit 552 and/or other circuits (not shown) in the cellular phone 550 may process data, perform coding and/or encryption, perform calculations, format data, and/or perform other cellular phone functions.

The cellular phone 550 may communicate with a mass data storage 564 that stores data in a nonvolatile manner. The mass data storage 564 may include magnetic storage devices such as hard disk drives (HDDs) and/or optical storage devices such as digital versatile disk (DVD) drives. The cellular phone 550 may be connected to memory 566 such as RAM, ROM, low latency nonvolatile memory such as flash memory, and/or other suitable electronic data storage. The cellular phone 550 may support connections to a WLAN via the WLAN interface 968. Cellular phone 550 may also include a power supply 553.

Figure 9D:
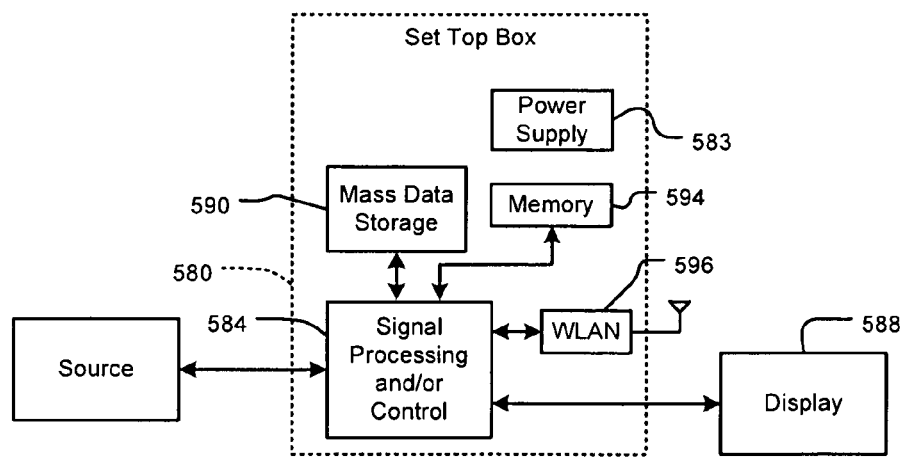
FIG. 9D is a functional block diagram of a set top box.

Referring now to FIG. 9D, the systems and methods can be implemented in a WLAN interface 596 of a set top box 580. The set top box 580 receives signals from a source such as a broadband source and outputs standard and/or high definition audio/video signals suitable for a display 588 such as a television and/or a monitor and/or other video and/or audio output devices. The signal processing and/or control circuit 584 and/or other circuits (not shown) of the set top box 580 may process data, perform coding and/or encryption, perform calculations, format data, and/or perform any other set top box function.

The set top box 580 may communicate with a mass data storage 590 that stores data in a nonvolatile manner. The mass data storage 590 may include magnetic storage devices such as hard disk drives HDD and/or optical storage devices such as DVD drives. The set top box 580 may be connected to memory 594 such as RAM, ROM, low latency nonvolatile memory such as flash memory and/or other suitable electronic data storage. The set top box 580 also may support connections to a WLAN via the WLAN interface 596. Set top box 580 may also include a power supply 583.

Figure 9E:
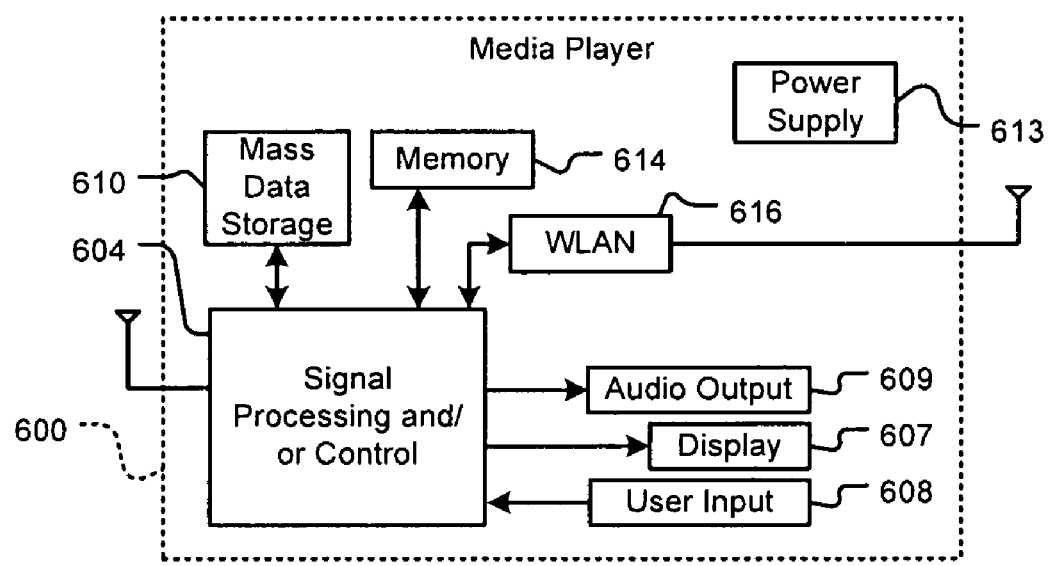
FIG. 9E is a functional block diagram of a media player.

Referring now to FIG. 9E, the systems and methods can be implemented in a WLAN interface 616 of a media player 600. In some implementations, the media player 600 includes a display 607 and/or a user input 608 such as a keypad, a touchpad, etc. In some implementations, the media player 600 may employ a graphical user interface (GUI) that typically employs menus, icons, and/or a point-and-click interface via the display 607 and/or the user input 608. The media player 600 further includes an audio output 609 such as a speaker and/or audio output jack. The signal processing and/ or control circuit 604 and/or other circuits (not shown) of the media player 600 may process data, perform coding and/or encryption, perform calculations, format data, and/or perform any other media player functions.

The media player 600 may communicate with a mass data storage 610 that stores data such as compressed audio and/or video content in a nonvolatile manner. In some implementations, the compressed audio files include files that are compliant with MP3 format or other suitable compressed audio and/or video formats. The mass data storage may include magnetic storage devices such as hard disk drives (HDDs) and/or optical storage devices such as digital versatile disk (DVD) drives. The media player 600 may be connected to memory 614 such as RAM, ROM, low latency nonvolatile memory such as flash memory, and/or other suitable electronic data storage. The media player 600 also may support connections to a WLAN via the WLAN interface 616. Media player 600 may also include a power supply 613. Still other implementations in addition to those described above are contemplated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A network device, comprising:
a first feedback module configured to selectively generate a first transmission schedule if a transmission schedule is not predetermined, wherein the first transmission schedule includes a first matrix map, and wherein the first transmission schedule is to be transmitted from the network device to a link partner; and
a first calibration module configured to selectively transmit a first set of training signals from the network device to the link partner, receive a first set of channel state information (CSI) (i) generated by the link partner based on the first set of training signals received from the network device and (ii) transmitted by the link partner to the network device according to the first transmission schedule received from the network device, and generate a first CSI matrix based on (i) the first set of CSI received from the link partner and (ii) the first matrix map, wherein the first transmission schedule includes a first subcarrier schedule to determine an order of transmitting subcarriers of first radio frequency (RF) signals,
wherein the first matrix map determines a sequence for communicating elements of the first set of CSI, where the elements of the first set of CSI constitute elements of the first CSI matrix, wherein the first calibration module is configured to (i) generate the same first set of training signals for each of the subcarriers and (ii) receive the first set of CSI for each of the subcarriers, and wherein the first set of CSI includes signal-to-noise ratios (SNRs) of the subcarriers.

2. The network device of claim 1, further comprising:
a first steering module configured to generate a first steering matrix based on the first CSI matrix;
a first control module configured to adjust beamforming weights of the network device based on the first steering matrix; and
a first beamforming module configured to direct transmission of the first RF signals toward the link partner based on the beamforming weights,
wherein the beamforming weights determine gain of the first RF signals.

3. The network device of claim 1, wherein the first feedback module is configured to determine correspondence between each of the subcarriers and the first CSI matrix for each of the subcarriers based on the first subcarrier schedule.

4. A wireless network comprising:
the network device of claim 2; and
the link partner,
wherein the link partner includes a second calibration module configured to
determine the first set of CSI based on the first set of training signals received from the network device,
generate the first CSI matrix based on the first set of CSI and the first matrix map, and
communicate the first set of CSI to the network device based on the first transmission schedule received from the network device.

5. The wireless network of claim 4:
wherein the link partner further comprises a second feedback module configured to generate a second transmission schedule,
wherein the second transmission schedule is transmitted from the link partner to the network device when the first feedback module does not generate the first transmission schedule, and
wherein the second transmission schedule includes a second matrix map.

6. The wireless network of claim 5, wherein:
the first feedback module is configured to receive the second transmission schedule from the link partner, and
the first calibration module is configured to
receive the first set of CSI from the link partner according to the second transmission schedule, and
generate the first CSI matrix based on the first set of CSI and the second matrix map.

7. The wireless network of claim 5, wherein:
the second calibration module is configured to transmit a second set of training signals from the link partner to the network device, and
the first calibration module is configured to
determine a second set of CSI based on the second set of training signals received from the link partner, and
generate a second CSI matrix based on (i) the second set of CSI and (ii) the first matrix map or the second matrix map.

8. The wireless network of claim 7, wherein the second calibration module is configured to:
receive the second set of CSI from the network device according to the first transmission schedule or the second transmission schedule, and
generate the second CSI matrix based on the first matrix map or the second matrix map.

9. The wireless network of claim 8, wherein the link partner further comprises:
a second steering module configured to generate a second steering matrix based on the second CSI matrix;
a second control module configured to adjust beamforming weights of the link partner based on the second steering matrix; and
a second beamforming module configured to direct transmission of second RF signals toward the network device based on the beamforming weights of the link partner,
wherein the beamforming weights of the link partner determine gain of the second RF signals.

10. The wireless network of claim 8, wherein:
the second transmission schedule includes a second subcarrier schedule to determine an order of transmitting subcarriers of the second RF signals, and
the second matrix map determines a sequence for communicating elements of the first set of CSI or the second set of CSI.

11. The wireless network of claim 10:
wherein the second calibration module is configured to (i) generate the second set of training signals for each of the subcarriers and (ii) receive the second set of CSI for each of the subcarriers,
wherein the second set of CSI includes SNRs of the subcarriers, and
wherein elements of the second set of CSI constitute elements of the second CSI matrix.

12. The wireless network of claim 11, wherein the first feedback module is configured to determine correspondence between each of the subcarriers and the second CSI matrix for each of the subcarriers based on the second subcarrier schedule.

13. The wireless network of claim 7:
wherein the first CSI matrix and the second CSI matrix are ($N_{TX} \times N_{RX}$) matrices,
where $N_{TX}$ is an integer greater than or equal to 1 and represents a number of transmit antennas, and
$N_{RX}$ is an integer greater than or equal to 1 and represents a number of receive antennas.

14. The wireless network of claim 9, wherein the network device further comprises:
a third steering module configured to generate a third steering matrix based on the second set of CSI according to the first matrix map or the second matrix map when
the link partner does not include at least one of the second steering module and the third steering module, and
the link partner does not generate the second steering matrix.

15. The wireless network of claim 14, wherein the second control module is configured to adjust the beamforming weights of the link partner based on the third steering matrix received from the network device according to the first transmission schedule or the second transmission schedule.

16. The wireless network of claim 14:
wherein the third steering matrix is a ($N_{TX} \times N_{SS}$) matrix,
where $N_{TX}$ is an integer greater than or equal to 1 and represents a number of transmit antennas, and
$N_{SS}$ is an integer greater than or equal to 1 and represents spatial streams of a frame.

17. The wireless network of claim 14, wherein:
the link partner is configured to receive the third steering matrix for each subcarrier of the second RF signals, and
the second feedback module is configured to determine correspondence between each subcarrier and the third steering matrix for each subcarrier based on the first transmission schedule or the second transmission schedule.

18. The wireless network of claim 9, wherein the link partner further comprises:
a third steering module configured to generate a third steering matrix based on the first set of CSI according to the first matrix map or the second matrix map when
the network device does not include at least one of the second steering module and the third steering module, and
the network device does not generate the first steering matrix.

19. The wireless network of claim 18, wherein the first control module is configured to adjust the beamforming weights of the network device based on the third steering matrix received from the link partner according to the first transmission schedule or the second transmission schedule.

20. The wireless network of claim 18:
wherein the third steering matrix is a ($N_{TX} \times N_{SS}$) matrix,
where $N_{TX}$ is an integer greater than or equal to 1 and represents a number of transmit antennas, and
$N_{SS}$ is an integer greater than or equal to 1 and represents spatial streams of a frame.

21. The wireless network of claim 18, wherein:
the network device is configured to receive the third steering matrix for each subcarrier of the first signals transmitted by the network device toward the link partner, and
the first feedback module is configured to determine correspondence between each subcarrier and the third steering matrix for each subcarrier based on the first transmission schedule or the second transmission schedule.

22. The wireless network of claim 4, wherein:
the network device is configured to (i) parse a frame into the first RF signals and (ii) transmit the first RF signals toward the link partner via $N_{TX}$ antennas, and
the link partner is configured to receive the first RF signals via $N_{RX}$ antennas,
where $N_{TX}$ and $N_{RX}$ are integers greater than or equal to 1.

23. The wireless network of claim 4, wherein:
the link partner is configured to (i) parse a frame into second RF signals and (ii) transmit the second RF signals toward the network device via $N_{TX}$ antennas, and
the network device is configured to receive the second RF signals via $N_{RX}$ antennas,
where $N_{TX}$ and $N_{RX}$ are integers greater than or equal to 1.

24. Method, comprising: selectively generating a first transmission schedule including a first matrix map if a transmission schedule is not predetermined; transmitting the first transmission schedule from a network device to a link partner; selectively transmitting a first set of training signals from the network device to the link partner;
receiving a first set of channel state information (CSI) (i) generated by the link partner based on the first set of training signals received from the network device and (ii) transmitted by the link partner to the network device according to the first transmission schedule received from the network device; and
generating a first CSI matrix based on the first set of CSI received from the link partner and the first matrix map, wherein the first transmission schedule includes a first subcarrier schedule to determine an order of transmitting subcarriers of first radio frequency (RF) signals, wherein the first matrix map determines a sequence for communicating elements of the first set of CSI, where the elements of the first set of CSI constitute elements of the first CSI matrix,
wherein the same first set of training signals is generated for each of the subcarriers
wherein the first set of CSI is received for each of the subcarriers, and wherein the first set of CSI includes signal-to-noise ratios (SNRs) of the subcarriers.

25. The method of claim 24, further comprising:
generating a first steering matrix based on the first CSI matrix;
adjusting beamforming weights of the network device based on the first steering matrix; and
directing transmission of the first RF signals toward the link partner based on the beamforming weights,
wherein the beamforming weights determine gain of the first RF signals.

26. The method of claim 24, further comprising determining correspondence between each of the subcarriers and the first CSI matrix for each of the subcarriers based on the first subcarrier schedule.

27. The method of claim 25, further comprising:
determining the first set of CSI based on the first set of training signals received by the link partner from the network device;
generating the first CSI matrix based on the first set of CSI and the first matrix map; and
communicating the first set of CSI to the network device based on the first transmission schedule received from the network device.

28. The method of claim 27, further comprising:
generating a second transmission schedule that includes a second matrix map; and
transmitting the second transmission schedule from the link partner to the network device when the network device does not generate the first transmission schedule.

29. The method of claim 28, further comprising:
receiving the second transmission schedule from the link partner;
receiving the first set of CSI from the link partner according to the second transmission schedule; and
generating the first CSI matrix based on the first set of CSI and the second matrix map.

30. The method of claim 28, further comprising:
transmitting a second set of training signals from the link partner to the network device;
determining a second set of CSI based on the second set of training signals received by the network device from the link partner; and
generating a second CSI matrix based on (i) the second set of CSI and (ii) the first matrix map or second matrix map.

31. The method of claim 30, further comprising:
receiving the second set of CSI from the network device according to the first transmission schedule or the second transmission schedule; and
generating the second CSI matrix based on the first matrix map or the second matrix map.

32. The method of claim 31, further comprising:
generating a second steering matrix based on the second CSI matrix;
adjusting beamforming weights of the link partner based on the second steering matrix; and
directing transmission of second RF signals toward the network device based on the beamforming weights of the link partner,
wherein the beamforming weights of the link partner determine gain of the second RF signals.

33. The method of claim 32, further comprising:
generating a second subcarrier schedule that determines an order of transmitting subcarriers of the second RF signals; and
determining a sequence for communicating elements of the first set of CSI or the second set of CSI based on the second matrix map.

34. The method of claim 33, further comprising:
generating the second set of training signals for each of the subcarriers; and
receiving the second set of CSI for each of the subcarriers,
wherein the second set of CSI includes SNRs of the subcarriers, and
wherein elements of the second set of CSI constitute elements of the second CSI matrix.

35. The method of claim 34, further comprising determining correspondence between each of the subcarriers and the second CSI matrix for each of the subcarriers based on the second subcarrier schedule.

36. The method of claim 30, wherein:
the first CSI matrix and the second CSI matrix are ($N_{TX} \times N_{RX}$) matrices,
where $N_{TX}$ is an integer greater than or equal to 1 and represents a number of transmit antennas, and
$N_{RX}$ is an integer greater than or equal to 1 and represents a number of receive antennas.

37. The method of claim 32, further comprising generating a third steering matrix based on the second set of CSI according to the first matrix map or the second matrix map when the link partner does not generate the second steering matrix.

38. The method of claim 37, further comprising adjusting the beamforming weights of the link partner based on the third steering matrix received from the network device according to the first transmission schedule or the second transmission schedule.

39. The method of claim 37, wherein:
the third steering matrix is a ($N_{TX} \times N_{SS}$) matrix,
where $N_{TX}$ is an integer greater than or equal to 1 and represents a number of transmit antennas, and
$N_{SS}$ is an integer greater than or equal to 1 and represents spatial streams of a frame.

40. The method of claim 37, further comprising:
receiving the third steering matrix for each subcarrier of the RF signals; and
determining correspondence between each subcarrier and the third steering matrix for each subcarrier based on one of the first and second transmission schedules.

41. The method of claim 32, further comprising generating a third steering matrix based on the first set of CSI according to the first matrix map or the second matrix map when the network device does not generate the first steering matrix.

42. The method of claim 41, further comprising adjusting the beamforming weights of the network device based on the third steering matrix received from the link partner according to the first transmission schedule or the second transmission schedule.

43. The method of claim 41:
wherein the third steering matrix is a ($N_{TX} \times N_{SS}$) matrix,
where $N_{TX}$ is an integer greater than or equal to 1 and represents a number of transmit antennas, and
$N_{SS}$ is an integer greater than or equal to 1 and represents spatial streams of a frame.

44. The method of claim 41, further comprising:
receiving the third steering matrix for each subcarrier of the first RF signals transmitted by the network device transmits toward the link partner; and
determining correspondence between each subcarrier and the third steering matrix for each subcarrier based on the first transmission schedule or the second transmission schedule.

45. The method of claim 27, further comprising:
parsing a frame into the first RF signals;
transmitting the first RF signals toward the link partner via $N_{TX}$ antennas; and
receiving the RF signals via $N_{RX}$ antennas of the link partner,
where $N_{TX}$ and $N_{RX}$ are integers greater than or equal to 1.

46. The method of claim 27, further comprising:
parsing a frame into second RF signals;
transmitting the second RF signals toward the network device via $N_{TX}$ antennas; and
receiving the second RF signals via $N_{RX}$ antennas of the network device,
where $N_{TX}$ and $N_{RX}$ are integers greater than or equal to 1.

* * * * *